United States Patent
Kitagawa et al.

(10) Patent No.: US 6,636,723 B1
(45) Date of Patent: Oct. 21, 2003

(54) CDMA RADIO COMMUNICATION SYSTEM USING CHIP INTERLEAVING

(75) Inventors: Keiichi Kitagawa, Yokosuka (JP); Mitsuru Uesugi, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/359,020

(22) Filed: Jul. 22, 1999

(30) Foreign Application Priority Data

Jul. 24, 1998 (JP) .......................................... 10-209911
Mar. 31, 1999 (JP) .......................................... 11-091429
Mar. 31, 1999 (JP) .......................................... 11-094269

(51) Int. Cl.$^7$ ............................................. H04B 7/216
(52) U.S. Cl. ......................... 455/69; 370/342; 455/522
(58) Field of Search ................................. 370/342, 332, 370/333, 441, 335, 318; 455/522, 69

(56) References Cited

U.S. PATENT DOCUMENTS

| | | | | |
|---|---|---|---|---|
| 5,216,692 A | * | 6/1993 | Ling ........................ 340/7.33 |
| 5,799,013 A | * | 8/1998 | Seshadri et al. ............. 370/342 |
| 5,896,374 A | * | 4/1999 | Okumura et al. ........... 340/7.44 |
| 5,982,760 A | * | 11/1999 | Chen .......................... 370/335 |
| 6,061,386 A | * | 5/2000 | Molev-Shteiman ......... 370/515 |
| 6,072,778 A | * | 6/2000 | Labedz et al. .............. 370/252 |

FOREIGN PATENT DOCUMENTS

| JP | 5-219015 | 8/1993 |
|---|---|---|
| JP | 6-97908 | 4/1994 |
| JP | 6204987 | 7/1994 |
| JP | 6-97913 | 8/1994 |

* cited by examiner

Primary Examiner—Nay Maung
Assistant Examiner—Nick Corsaro
(74) Attorney, Agent, or Firm—Greenblum & Bernstein, P.L.C.

(57) ABSTRACT

In a CDMA transmission, a quality of each symbol of a frame is held constant by interleaving spread chip, while overhead and interference amounts in other cells are reduced by easing a rate of transmission power control. Further, transmission power is decreased by discontinuing transmission at the time the quality is satisfied, thereby increasing the system capacity. Furthermore, it is possible to achieve more remarkable effect by performing inverse transmission power control.

15 Claims, 30 Drawing Sheets

CDMA RADIO COMMUNICATION SYSTEM USING CHIP INTERLEAVING

BACKGROUND OF THE INVENTION

1. Field of the Invention

The present invention relates to a CDMA radio communication system and method in a digital radio communication using the CDMA (Code Division Multiple Access).

2. Description of the Related Art

FIG. 1 is a block diagram illustrating a configuration of a conventional CDMA radio communication system. In the CDMA radio communication system, at a transmission side, transmission data 1 is spread at spreading section 2. The spread signal is modulated at modulation section 3 and then amplified at transmission amplifying section 4. The resultant signal is transmitted from transmission antenna 5. An amplitude in transmission amplifier 4 is determined at high rate transmission power setting section 6.

On the other hand, at a reception side, a signal received at reception antenna is detected at detection section 12 and then despread at despreading section 13. Received data 14 is thus obtained. Then, received data 14 is subjected to estimation of slot (an interval of few symbols) quality at slot quality detection section 16. Based on the estimation result, high rate transmission power control section 15 calculates a control value of high rate transmission power. The control information is transmitted to high rate transmission power setting section 6 at the transmission side.

The signals spread at spreading section 2 are configured in order of symbol as illustrated in FIG. 2. FIG. 2 illustrates an example of the case of 8 symbols with spreading factor 16. A symbol is composed of 16 chips.

FIG. 3 is a diagram to explain the reception quality in the conventional CDMA radio communication system. FIG. 3 illustrates an example in which the order of transmitted chips differs between two users of user A and user B by 5 chips. In addition, fading in each link is independent.

With respect to signals of user A, since transmission power is controlled at high rate transmission power setting section 6 that performs the setting according to an instruction from high rate transmission power control section 15, the fluctuation of line quality due to fading is canceled. Hence, the quality of received data 14 shows an almost constant level as illustrated in FIG. 3. Thus, in the CDMA radio communication system, each user is controlled to transmit a signal in the required minimum transmission power according to the transmission power control, in order to decrease the total interference of the system and improve the system capacity.

FIG. 4 is a diagram illustrating an interference amount in the conventional CDMA radio communication system. As been understood from FIG. 4, MS transmission power varies in inverse proportion to the fading between MS and BS_A (hereinafter referred to as fading MS-BS_A. In other words, MS transmission power is adjusted to cancel fading MS-BS_A.

At this point, since the fading between MS and BS_B (hereinafter referred to as fading MS-BS_B) and fading MS-BS_A are each independent, the interference amount in BS_B that is an other base station varies in such a manner a large peak appears as illustrated in FIG. 4. Even in this case, the average value of interference amounts is less than the case where power transmission control in not performed. It is thereby possible to decrease the total transmission power in the system.

However, in the conventional CDMA radio communication system, since spread signals are arranged to be concentrated upon a successive short time in the same frequency, when the short time is affected by fading and shadowing, qualities of all chips in the time deteriorate at the same time, resulting in that the qualities are not improved even though the spreading gain is obtained by despreading. It thereby results in another problem that the system capacity is limited because the transmission is performed under large transmission power. In addition, in a CDMA-TDD system, since the common frequency is used in forward and reverse links, it is necessary, for example, for a base station to finish the reverse reception before starting the forward transmission. Therefore, a guard time corresponding to a propagation delay time is required with the length limited to ensure the transmission efficiency, thereby resulting in the problem that a cell radius is limited.

SUMMARY OF THE INVENTION

An object of the present invention is to provide a CDMA radio communication system and method which has resistances against fading and shadowing to improve qualities, and in a TDD system, enables a guard time to be reduced and a cell radius to be extended.

In the digital radio communication system, in the case where a temporarily long burst error is caused due to affects of, for example, fading, interleaving is performed to decrease the affects to be provided to an error correction decoding section by diffusing the burst error. This interleaving is performed for every slot, and therefore does not correspond to fading and shadowing.

Considering of the aforementioned point, the present inventors found out the interleaving of spread chips enables a quality of each symbol in a frame to be kept constant, while a rate of transmission power control to be alleviated, and achieved the present invention. It is thereby possible to reduce overhead and decrease interference amounts to other cells.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Embodiments of the present invention will be described in detail in the following with reference to accompanying drawings.

Embodiment 1

Figure 5:
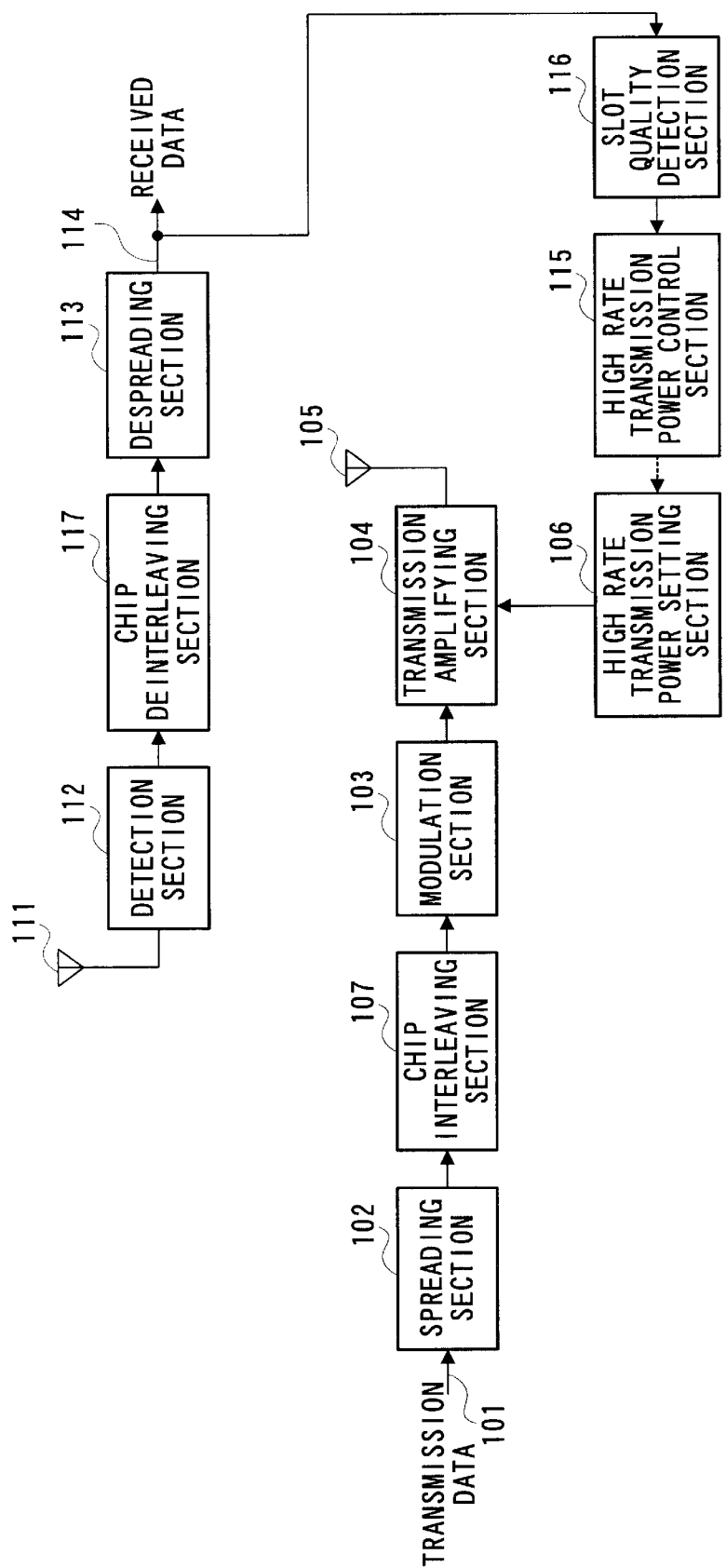
FIG. 5 is a block diagram illustrating a configuration of a CDMA radio communication apparatus according to Embodiment 1 of the present invention.

FIG. 5 is a block diagram illustrating a configuration of a CDMA radio communication apparatus according to Embodiment 1 of the present invention.

In a transmitter, transmission data 101 is spread at spreading section 102, and then subjected to chip interleaving processing at chip interleaving section 107. The interleaved signal is modulated at modulation section 103, amplified at transmission amplifying section 104 and then transmitted from transmission antenna 105.

In a receiver, a signal received at reception antenna 111 is detected at detection section 112, and then subjected to inverse arrangement to the chip interleaving at the transmission side, i.e., deinterleaving, at chip deinterleaving section 117. The deinterleaved data is combined at despreading section 113 to obtain received data 114. Further, the slot quality of received data 114 is detected at slot quality detection 116. Based on the detection result, high rate transmission power control section 115 generates a signal indicative of transmission power control of high rate to transmit to the transmitter. In the transmitter, based on the control signal, high rate transmission power setting section 106 performs transmission power setting of high rate and controls an amplitude for transmission amplifying section 104.

Operations in the CDMA radio communication apparatus with the above configuration will be described next.

Figure 6:
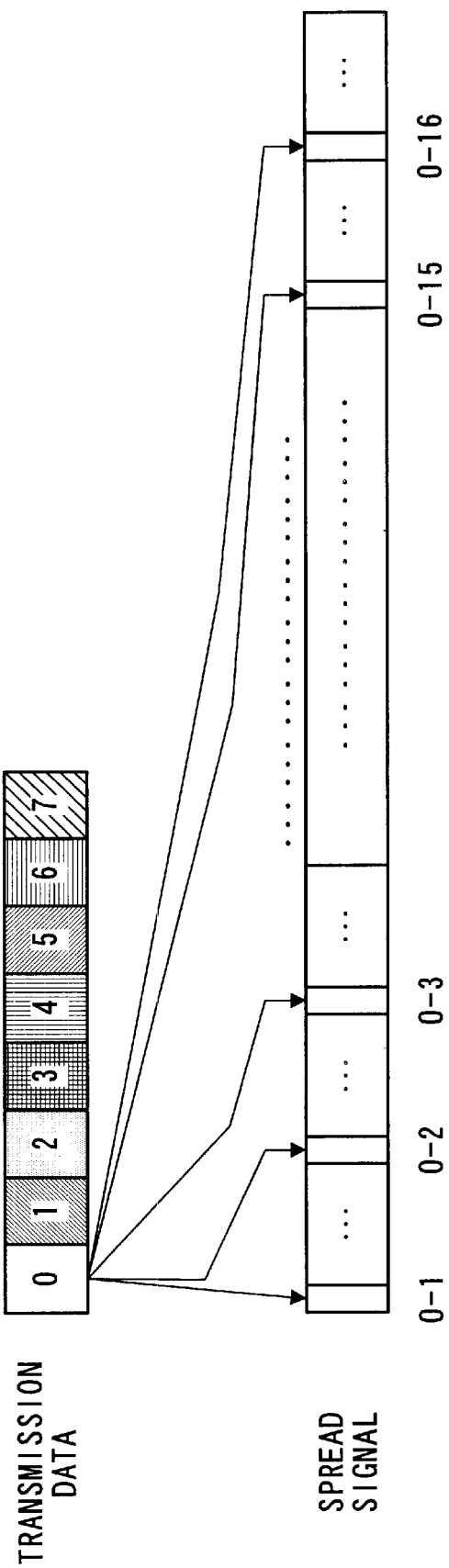
FIG. 6 is an arrangement diagram of chips interleaved in the CDMA radio communication apparatus according to Embodiment 1.

Transmission data 101 is spread at spreading section 102, and then subjected to chip interleaving processing at chip interleaving section 107. FIG. 6 illustrates an example of chip interleaving. In this example, 1 slot contains 8 symbols of spreading factor 16.

In FIG. 6, symbol 0 is spread to 16 chips. The 16 chips are not arranged serially, but each chip is assigned every 8 chips period. Further, the other 16 chips obtained by respectively spreading symbols 1 to 7 are not arranged serially either, but each one is assigned every 8 chips period. Accordingly, with respect to chip interleaved spread signals, in slot 1, chip (0-1) of symbol 0, chip (1-1) of symbol 1, chip (2-1) of symbol 2, chip (3-1) of symbol 3, chip (4-1) of symbol 4, chip (5-1) of symbol 5, chip (6-1) of symbol 6, and chip (7-1) of symbol 7 are assigned in this order. Likewise, chip assignment in slots 2–16 is done in the same way as done in slot 1. For example, in slot 2, chip (0-2) of symbol 0, chip (1-2) of symbol 1, chip (2-2) of symbol 2, chip (3-2) of symbol 3, chip (4-2) of symbol 4, chip (5-2) of symbol 5, chip (6-2) of symbol 6, and chip (7-2) of symbol 7 are assigned in this order.

Figure 1:
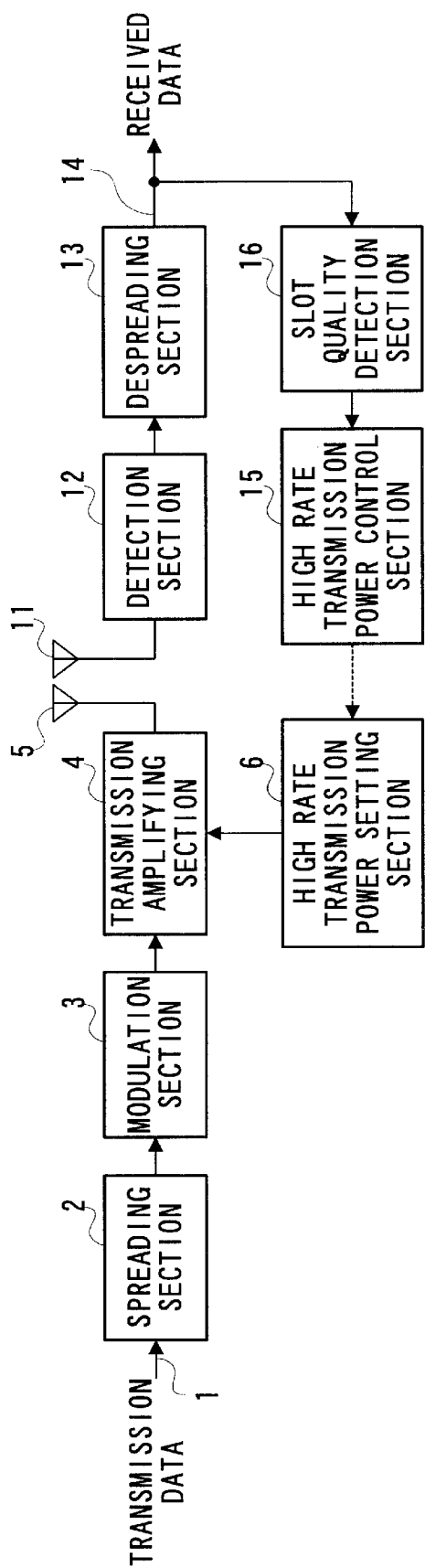
FIG. 1 is a block diagram illustrating a configuration of a conventional CDMA radio communication apparatus.
Figure 2:
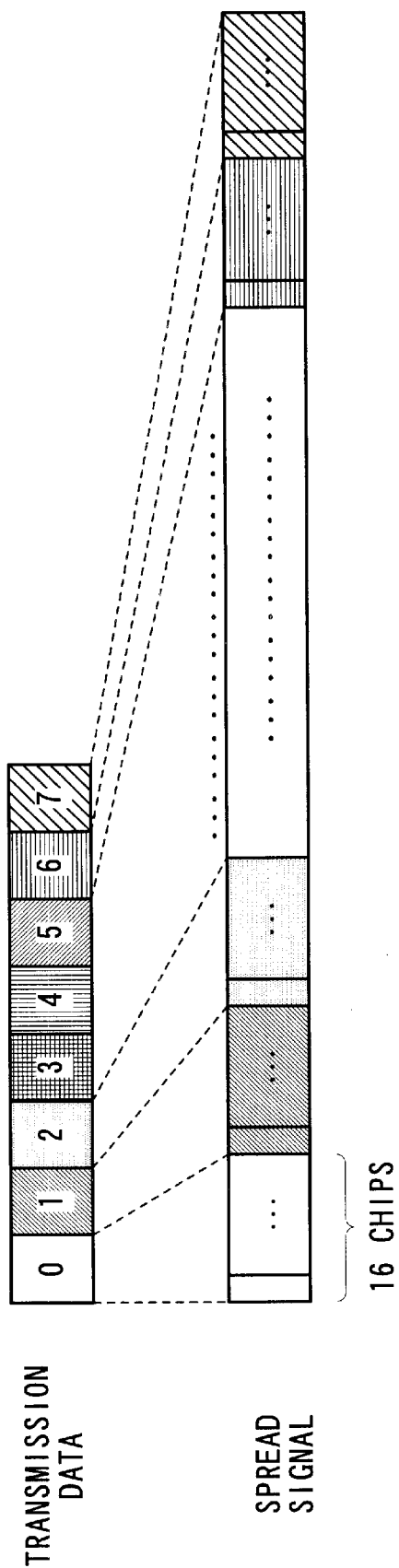
FIG. 2 is an arrangement diagram of chips in the conventional CDMA radio communication apparatus.
Figure 3:
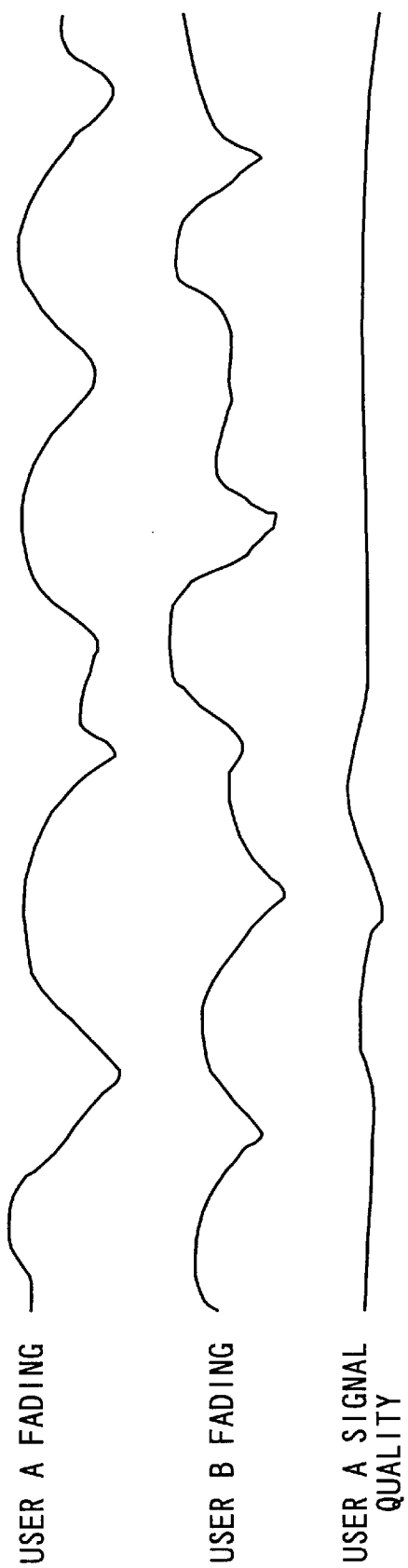
FIG. 3 is a diagram to explain reception qualities in the conventional CDMA radio communication apparatus.

According to the aforementioned processing, it is possible to perform the high rate power control capable of following fading. A specific example is described using FIG. 3 and FIG. 4. In FIG. 3, when it is assumed that the spreading factor is 16 and the total symbol number is N, 0th chips to 15th chips for symbols 0 to N−1 are assigned respectively in user A slots 0 to 15 after chip interleaving.

Qualities do not vary largely in a slot, but vary largely between slots, due to user A fading. In this system, since the high rate transmission power control is performed, the user A signal quality is almost constant between slots, however is not always constant due to control delay and error when fading occurs rapidly.

In this embodiment, since the chip interleaving processing is performed, chips for one symbol are divided to be assigned for a plurality of slots, thereby accepting control delay and error caused by rapid fading. Hence, S/N (signal to noise ratio) is improved by approximately 12 dB in the case of spreading factor 16 by that spread chip interleaved signal is deinterleaved and then despread. As a result, variation of qualities between symbols can be reduced. Further, the same effect as in user A slot is obtained in user B slot in which five slots are shifted in the order as compared with user A slots as illustrated in FIG. 3.

Figure 4:
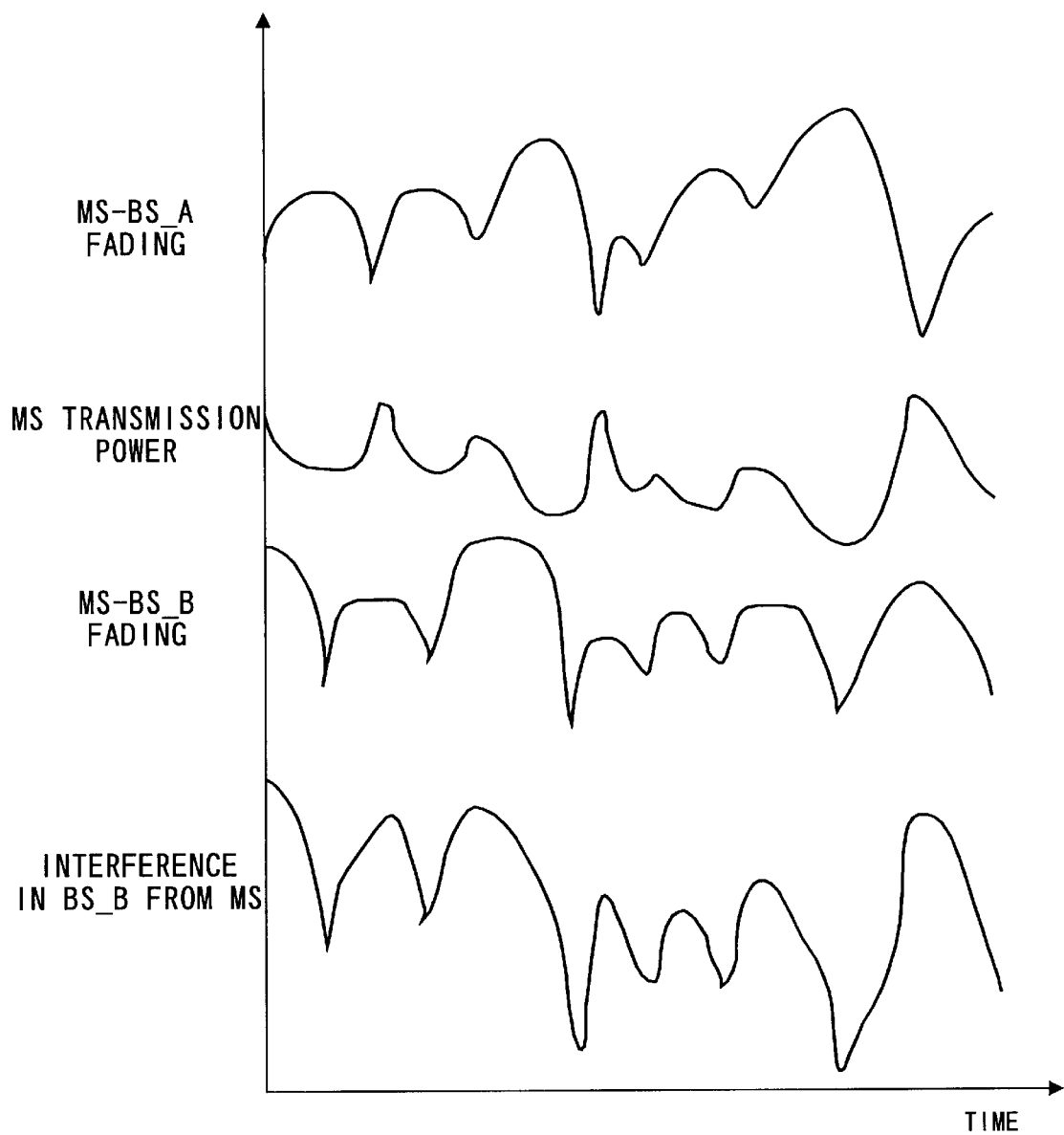
FIG. 4 is a diagram to explain interference amounts in the conventional CDMA radio communication apparatus.

Furthermore, as illustrated in FIG. 4, with respect to interference in BS_B caused by user A signal due to transmission power control performed by BS_A for user A, the relative value to transmission power is not changed as compared to the conventional case. However, the absolute value is lowered because total transmission power is suppressed with error correction capability improved by reducing the variation of qualities between symbols as mentioned above.

As described above, according to the radio communication system provided with the CDMA radio communication apparatus of Embodiment 1, it is possible to decrease total transmission power and thereby increase the system capacity. This method has effects in down link and higher effects in up link. The reduction of total transmission power further allows at the same time achieving of battery saving in a communication terminal such as a mobile station.

Embodiment 2

Figure 7:
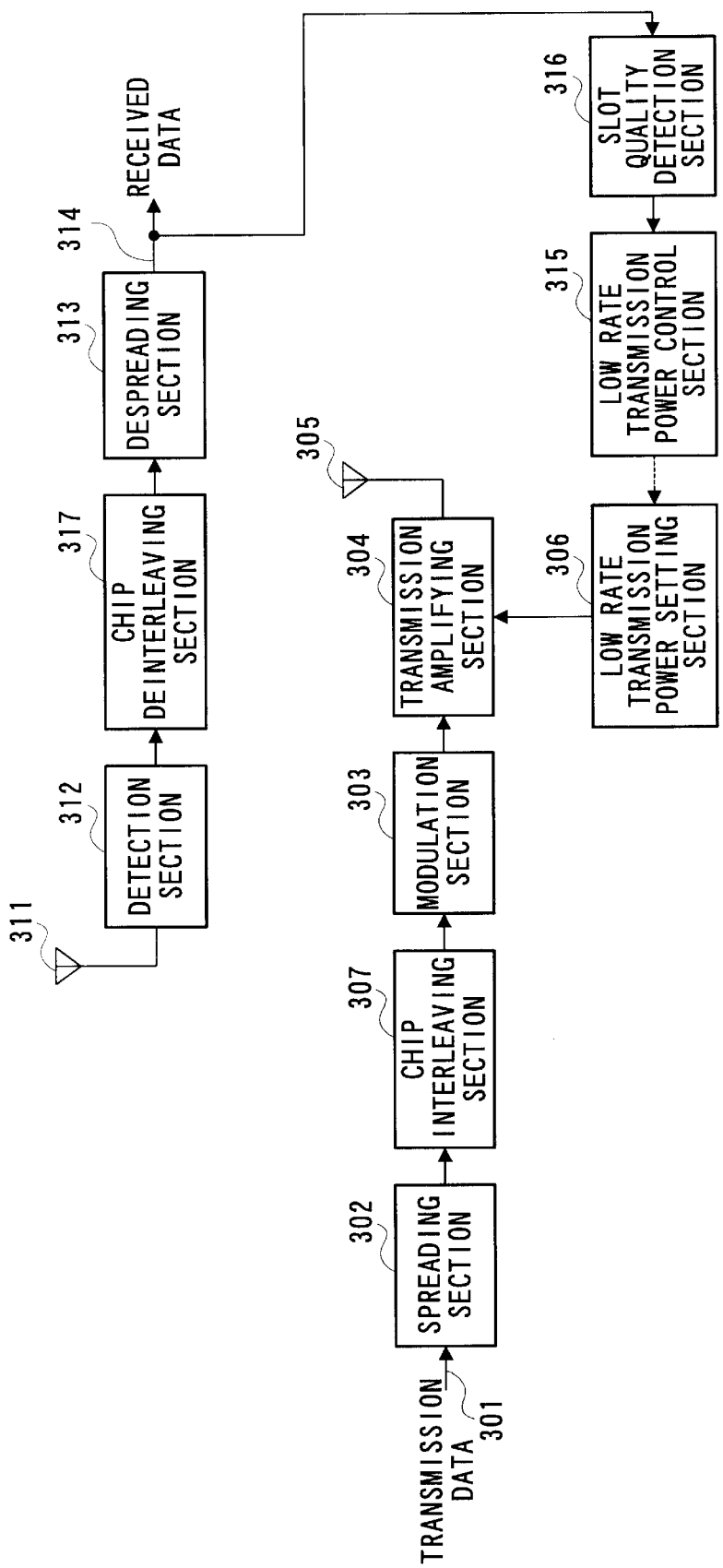
FIG. 7 is a block diagram illustrating a configuration of a CDMA radio communication apparatus according to Embodiment 2 of the present invention.

FIG. 7 is a block diagram illustrating a configuration of a CDMA radio communication apparatus according to Embodiment 2 of the present invention.

In a transmitter, transmission data 301 is spread at spreading section 302, and then subjected to chip interleaving processing at chip interleaving section 307. The interleaved signal is modulated at modulation section 303, amplified at transmission amplifying section 304 and then transmitted from transmission antenna 305.

In a receiver, a signal received at reception antenna 311 is detected at detection section 312, and then subjected to inverse arrangement to the chip interleaving at the transmission side, i.e., deinterleaving, at chip deinterleaving section 317. The deinterleaved data is combined at despreading section 313 to obtain received data 314. Further, the slot quality of received data 314 is detected at slot quality detection 116. Based on the detection result, low rate transmission power control section 315 generates a signal indicative of transmission power control of low rate to transmit to the transmitter. In the transmitter, based on the control signal, low rate transmission power setting section 306 performs transmission power setting of low rate and controls an amplitude for transmission amplifying section 304. Herein, the low rate transmission power control is a control adaptive not to rapid variation due to Rayleigh fading, but only to slow variation due to attenuation caused by distance variation and shadowing, thus making a difference from the high rate transmission power control in this specification.

Figure 8:
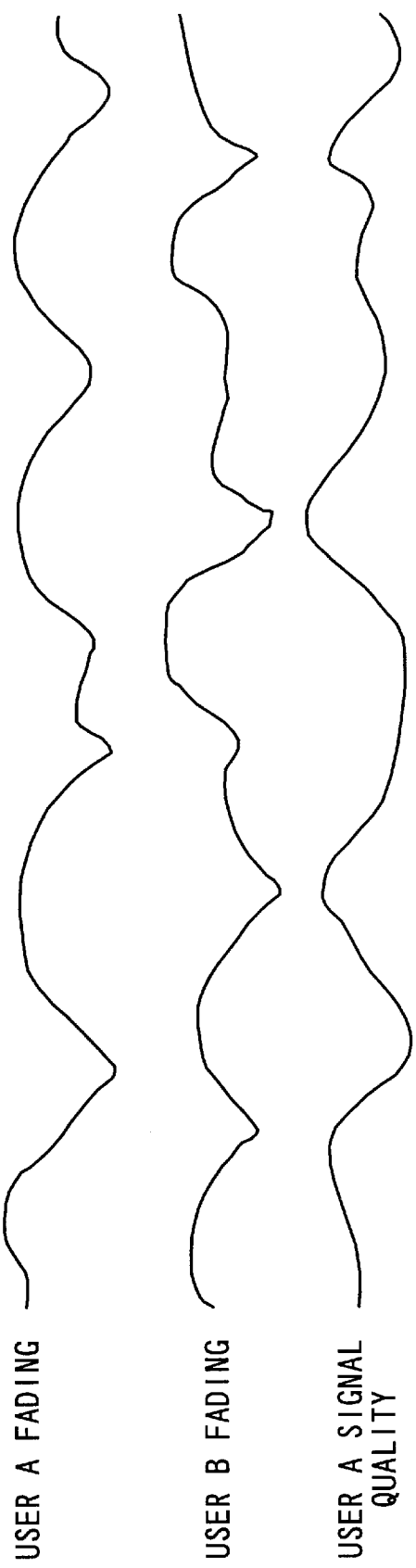
FIG. 8 is a diagram to explain reception qualities in the CDMA radio communication apparatus according to Embodiment 2.

Operations in the CDMA radio communication apparatus configured as described above are the same as those in Embodiment 1 except that low rate transmission power control is performed. In this case, it is not intended to follow fading, but it is intended to perform the low rate transmission power control capable of following only slow variation such as distance variation. A specific example is described using FIG. 8 and FIG. 9. In FIG. 8, when it is assumed that the spreading factor is 16 and the total symbol number is N, 0th chips to 15th chips for symbols 0 to N−1 are arranged respectively in user A slots 0 to 15 after chip interleaving.

Qualities do not vary largely in a slot, but vary largely depending on slots, due to user A fading. In this system, since the low rate transmission power control is performed, the difference of qualities between slots is large. In this embodiment, since the chip interleaving processing is performed, chips for one symbol are divided to be assigned for a plurality of slots. Accordingly, chips for one symbol are arranged both in slots with high signal quality and other slots with low signal quality. Therefore, the probability that qualities of all chips deteriorate is extremely low and qualities with a certain level are kept, even though the low rate transmission power control is performed.

Since spread chip interleaved signal is deinterleaved and then despread, it is possible to obtain the improvement effect in the same manner as in equal-gain combining diversity with 16 branches, while decreasing fluctuations of qualities between slots. Further, the same effect as in user A slot is obtained in user B slot in which five slots are delayed comparing with user A slots as illustrated in FIG. 8.

Figure 9:
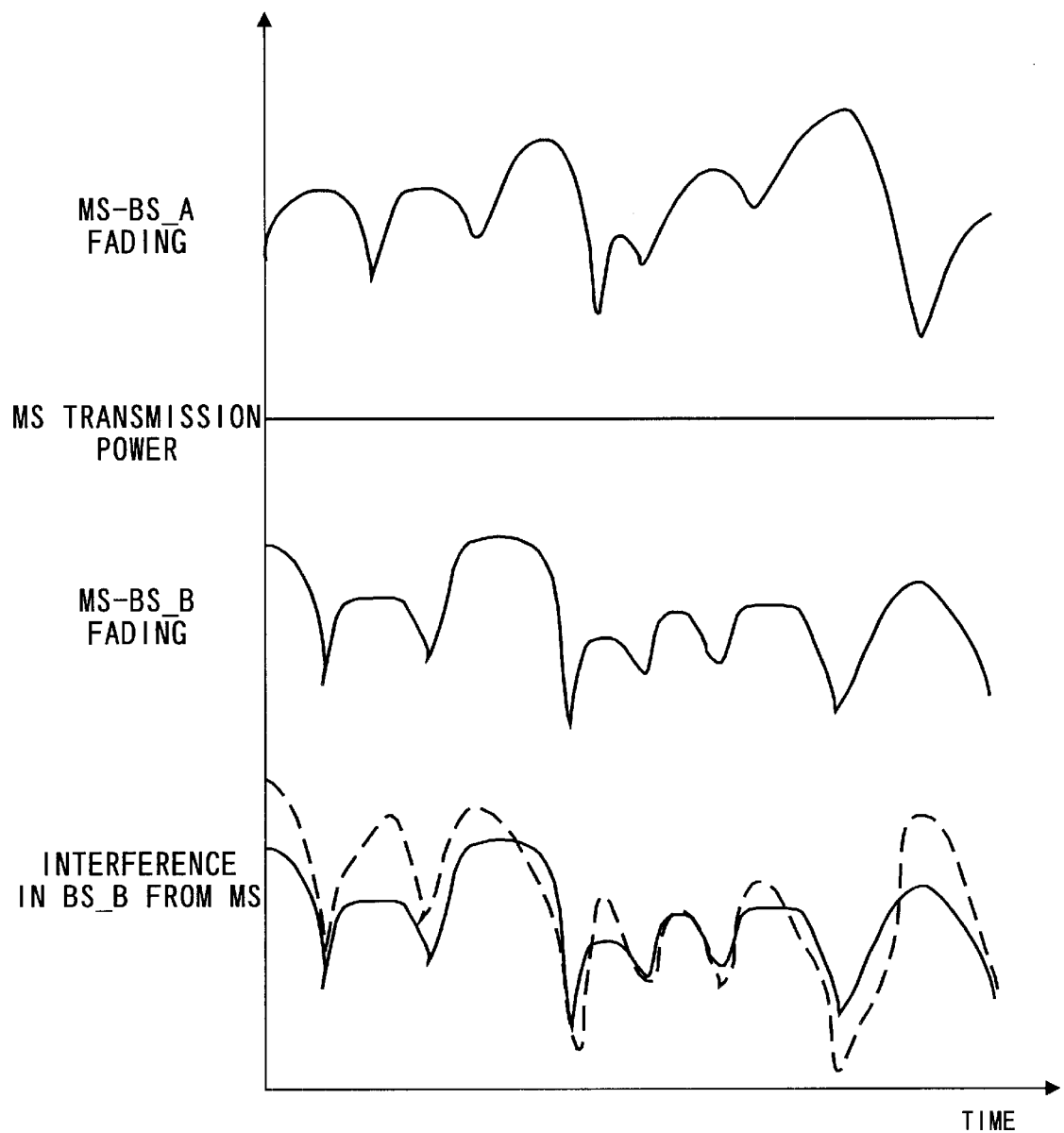
FIG. 9 is a diagram to explain interference amounts in the CDMA radio communication apparatus according to Embodiment 2.

Furthermore, as illustrated in FIG. 9, with respect to interference in BS_B caused by user A signal, it is possible to decrease a peak interference amount (solid line in FIG. 9) as compared with the interference in Embodiment 1 (dotted line in FIG. 9). Accordingly, the transmission does not require excessive power, and thereby it is possible to decrease total transmission power in the system.

As described above, according to the radio communication system provided with the CDMA radio communication apparatus of Embodiment 2, it is possible to further decrease reduce total transmission power and thereby increase the system capacity. Further, since the peak value of transmission power control is decreased, it is possible to suppress a dynamic range of transmission amplifier and decrease power consumption and cost.

Embodiment 3

Figure 10:
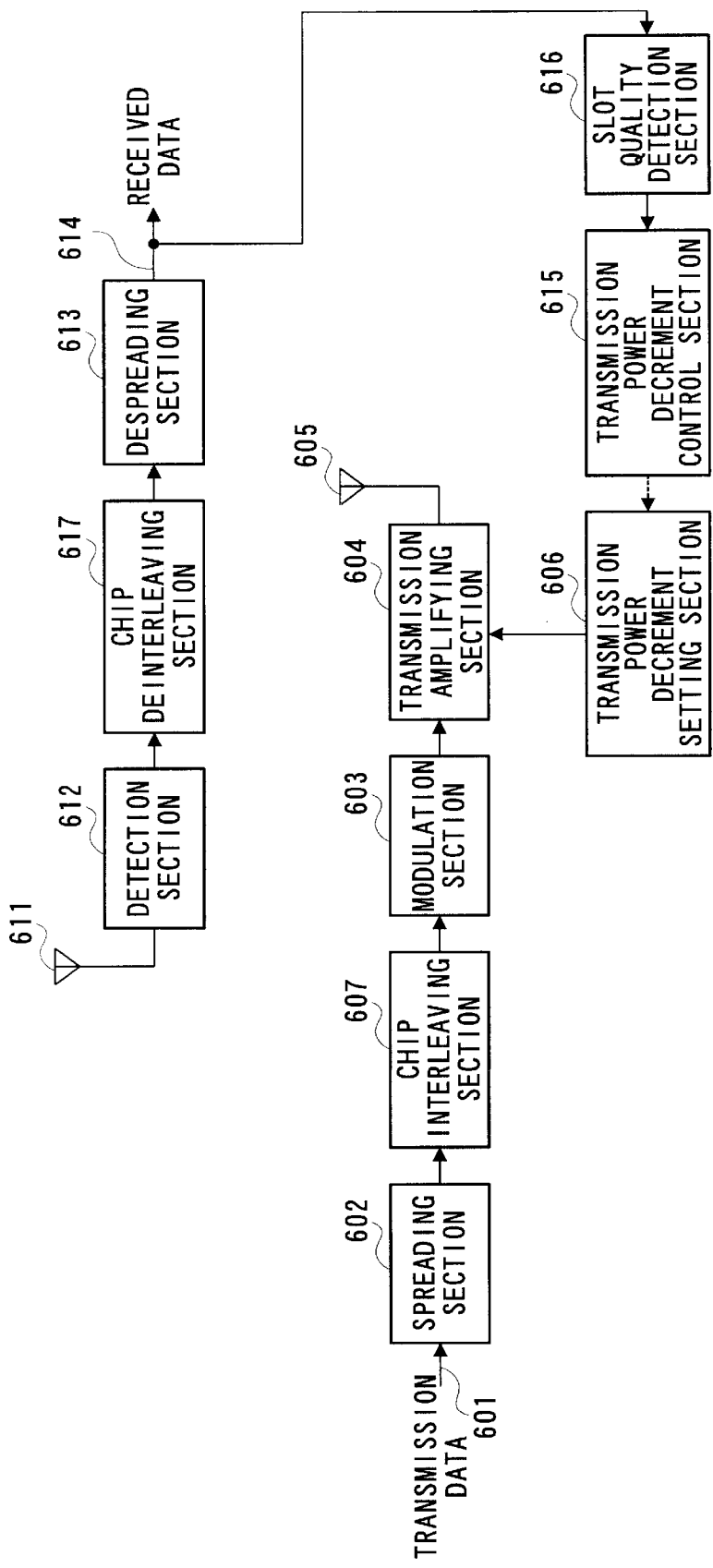
FIG. 10 is a block diagram illustrating a configuration of a CDMA radio communication apparatus according to Embodiment 3 of the present invention.

FIG. 10 is a block diagram illustrating a configuration of a CDMA radio communication apparatus according to Embodiment 3 of the present invention.

In a transmitter, transmission data 601 is spread at spreading section 602, and then subjected to chip interleaving processing at chip interleaving section 607. The interleaved signal is modulated at modulation section 603, amplified at transmission amplifying section 604 and then transmitted from transmission antenna 605.

In a receiver, a signal received at reception antenna 611 is detected at detection section 612, and then subjected to inverse arrangement to the chip interleaving at the transmission side, i.e., deinterleaving, at chip deinterleaving section 617. The deinterleaved data is combined at despreading section 613 to obtain received data 614. Further, the slot quality of received data 614 is detected at slot quality detection 616. Based on the detection result, transmission power decrement control section 615 generates a signal indicative of transmission power decrement control to transmit to the transmitter. In the transmitter, based on the control signal, transmission power decrement setting section 606 performs transmission power setting and controls an amplitude for transmission amplifying section 604.

Operations in the CDMA radio communication apparatus configured as described above are the same as those in Embodiment 1 except that transmission power decrement control is performed. In other words, according to the transmission power decrement control, a transmission time is shortened when the transmission is performed with excess quality. As a result, it is possible to transmit a signal in required minimum total transmission power.

Figure 11:
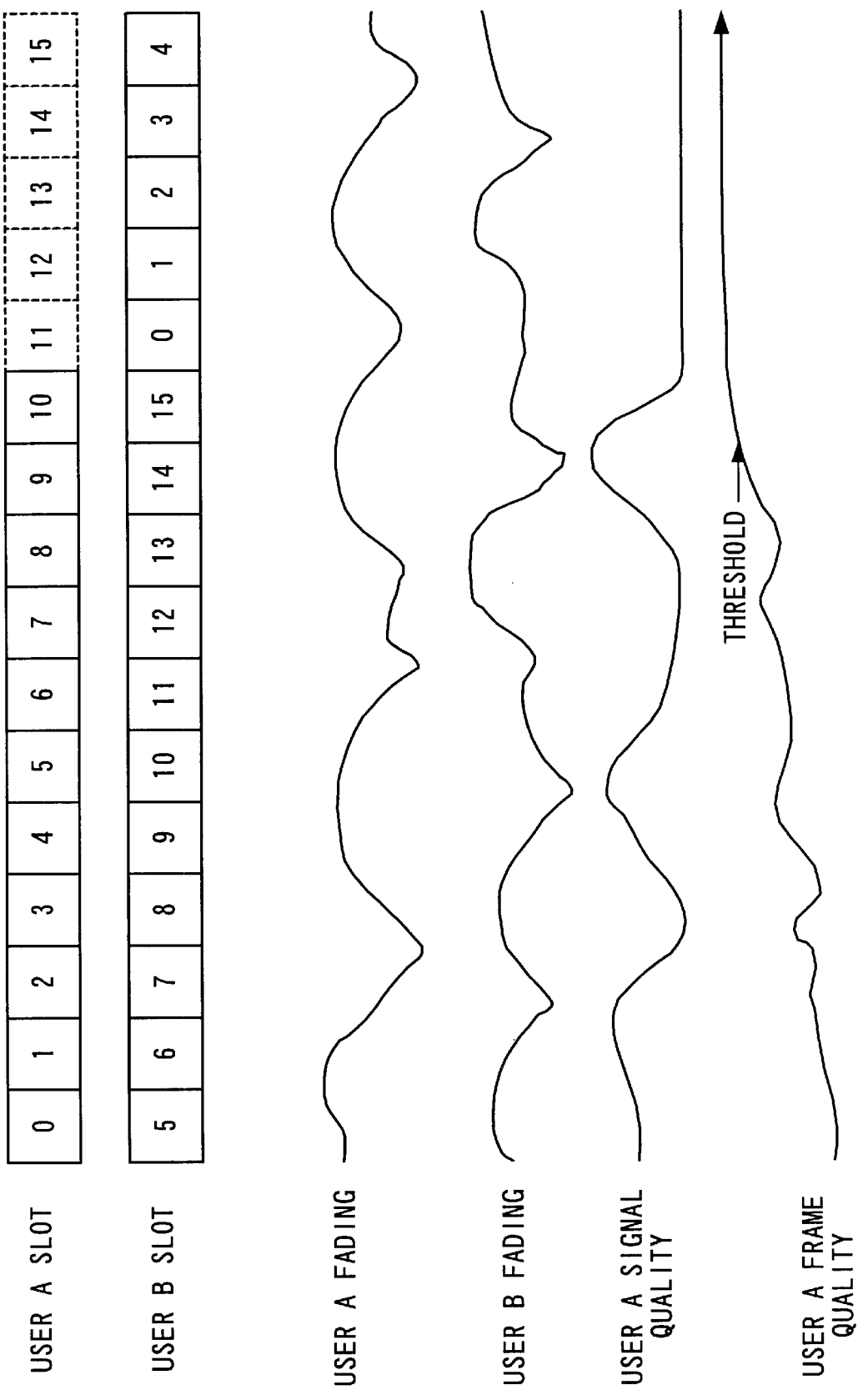
FIG. 11 is a diagram to explain reception qualities in the CDMA radio communication apparatus according to Embodiment 3.
Figure 12:
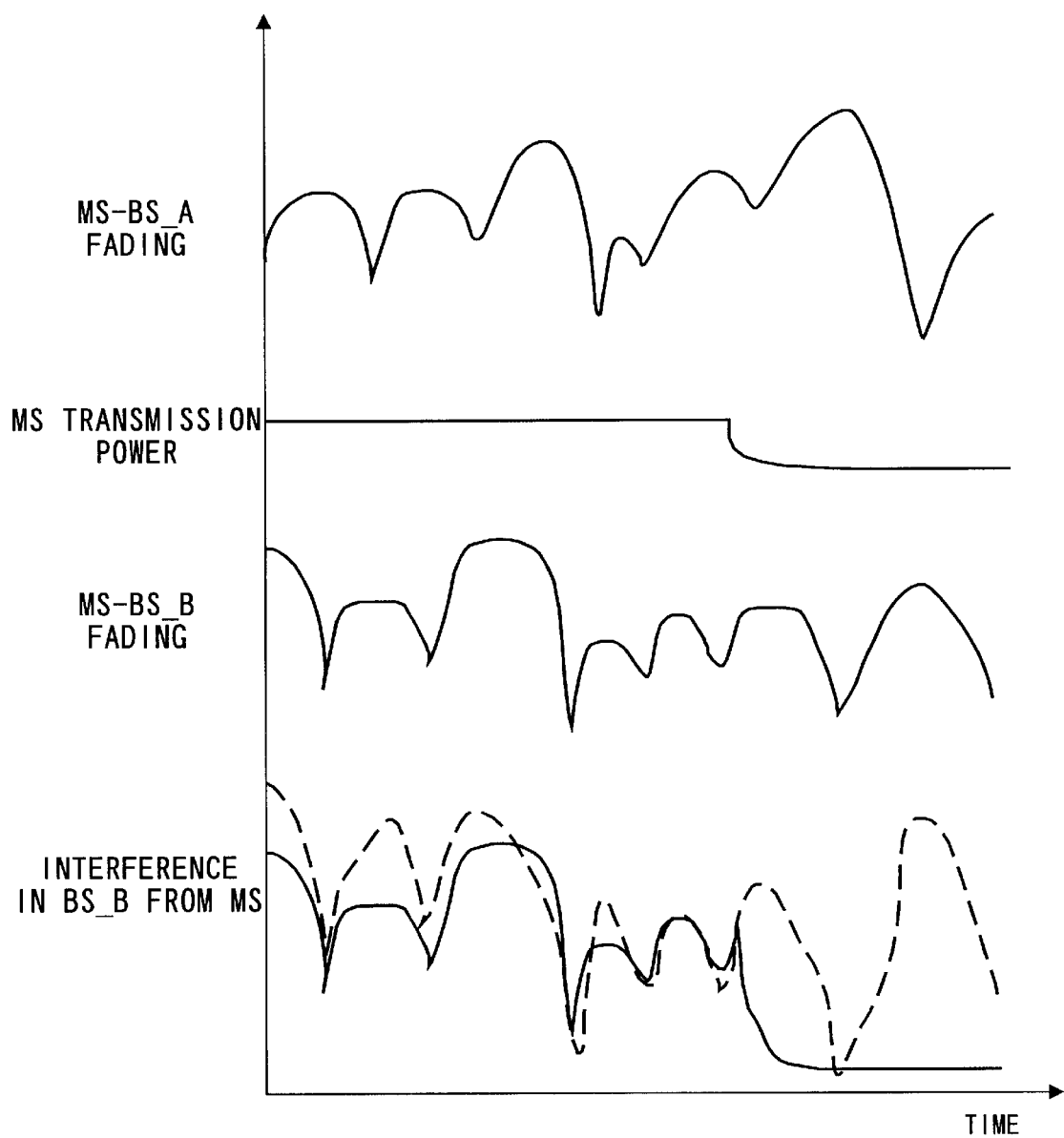
FIG. 12 is a diagram to explain interference amounts in the CDMA radio communication apparatus according to Embodiment 3.

A specific example is described using FIG. 11 and FIG. 12. In FIG. 11, when it is assumed that the spreading factor is 16 and the total symbol number is N, 0th chips to 15th chips for symbols 0 to N−1 are arranged respectively in user A slots 0 to 15 after chip interleaving. It is further assumed that one frame contains slots 0 to 15.

Qualities do not vary largely in a slot, but vary largely depending on slots, due to user A fading. In this system, the transmission power decrement control is performed, in other words, when the quality of a frame is higher than a threshold, following signals are not transmitted. Then, the high rate transmission power control of Embodiment 1 or the low rate transmission power control of Embodiment 2 is performed until the frame quality of user A exceeds the threshold, and the transmission power is decreased after the frame quality of user A exceeds the threshold.

For example, as illustrated in FIG. 11, in the case where the slot order difference between user A and user B are 5 slots, when the transmission power is decreased at the time the user A frame quality exceeds the threshold, user A signals do not interfere in slots 0 to 4 of user B. As a result, it is expected that the user B frame quality exceeds the threshold faster. Therefore, the transmission power of user B signals is decreased earlier, as a result, the user A frame quality is improved. Thus, the signal qualities are improved synergistically by mutual transmission power decrement of user A and user B, and it is thereby possible to decrease the system total transmission power largely.

Furthermore, as illustrated in FIG. 12, with respect to interference in BS_B caused by user A signal, it is possible to decrease a peak interference amount (solid line in FIG. 12) as compared with the interference in Embodiment 1 (dotted line in FIG. 12) by the transmission power decrement control performed by BS_A to user A. Still furthermore, since it is possible to achieve no transmission power in latter half of the frame, the total transmission power can be decreased.

Thus, according to the radio communication system provided with the CDMA radio communication apparatus of Embodiment 3, it is possible to further decrease total transmission power and thereby increase the system capacity than Embodiment 1 and Embodiment 2.

Embodiment 4

Figure 13:
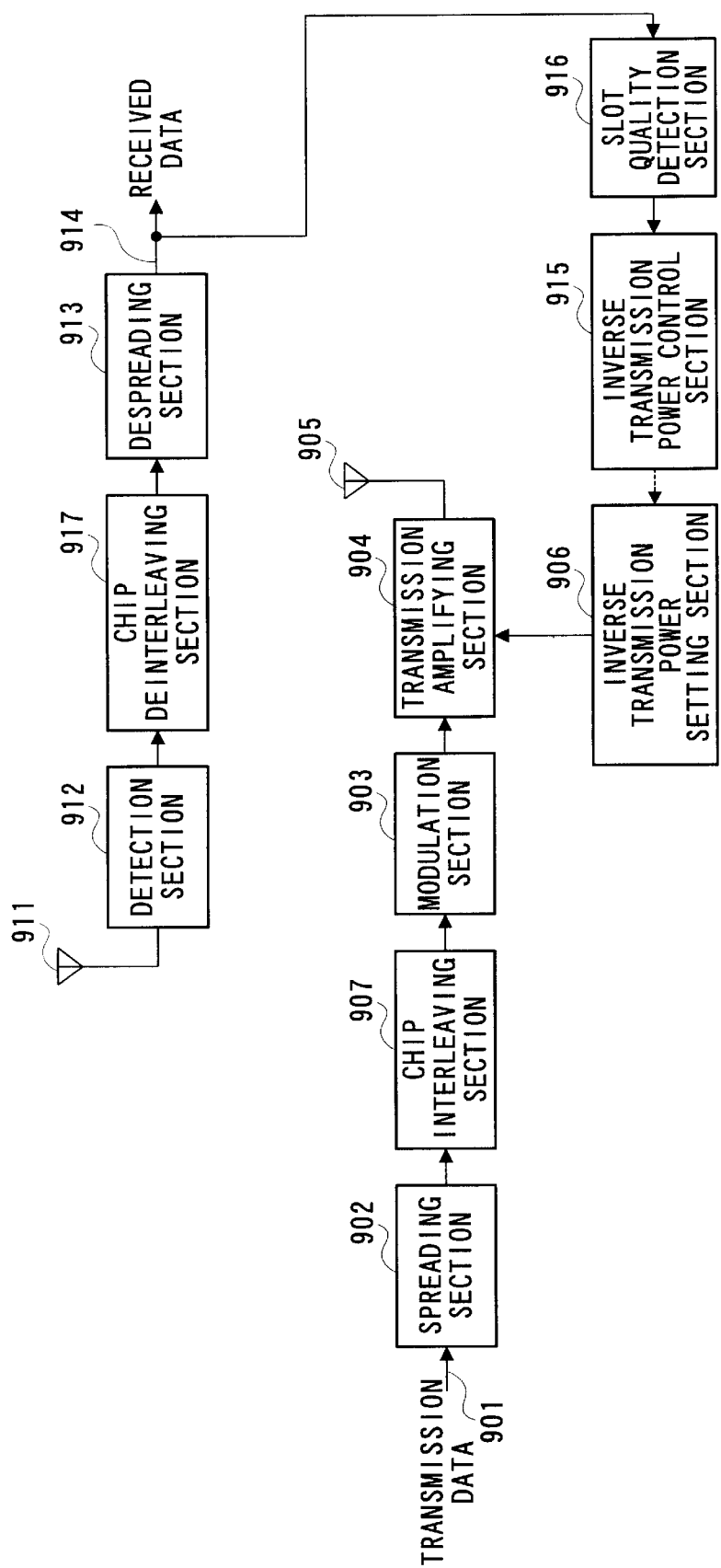
FIG. 13 is a block diagram illustrating a configuration of a CDMA radio communication apparatus according to Embodiment 4 of the present invention.

FIG. 13 is a block diagram illustrating a configuration of a CDMA radio communication apparatus according to Embodiment 4 of the present invention.

In a transmitter, transmission data 901 is spread at spreading section 902, and then subjected to chip interleaving processing at chip interleaving section 907. The interleaved signal is modulated at modulation section 903, amplified at transmission amplifying section 904 and then transmitted from transmission antenna 905.

In a receiver, a signal received at reception antenna 911 is detected at detection section 912, and then subjected to inverse arrangement to the chip interleaving at the transmission side, i.e., deinterleaving, at chip deinterleaving section 917. The deinterleaved data is combined at despreading section 913 to obtain received data 914. Further, the slot quality of received data 914 is detected at slot quality detection section 916. Based on the detection result, inverse transmission power control section 915 generates a signal indicative of inverse transmission power control to transmit to the transmitter. In the transmitter, based on the control signal, inverse transmission power setting section 906 performs inverse transmission power setting and controls an amplitude for transmission amplifying section 904.

Operations in the CDMA radio communication apparatus configured as described above are the same as those in Embodiment 1 except that inverse transmission power control is performed. In an ordinary transmission power control, transmission power is increased when the quality is low, while is decreased when the quality is high, in order to keep constant qualities. In the inverse transmission power control, transmission power is increased for signals with high quality, while is decreased for signals with low quality.

Under such a control, the signals with high qualities are transmitted with greater power. In such a case, since the link is advantageous to transmission, it is possible to improve qualities for signals with high qualities drastically with a small increment of power. On the other hand, since it is not expected to improve qualities for signals with low qualities with such increment of power, the transmission power is increased in order not to interfere in other users.

Figure 14:
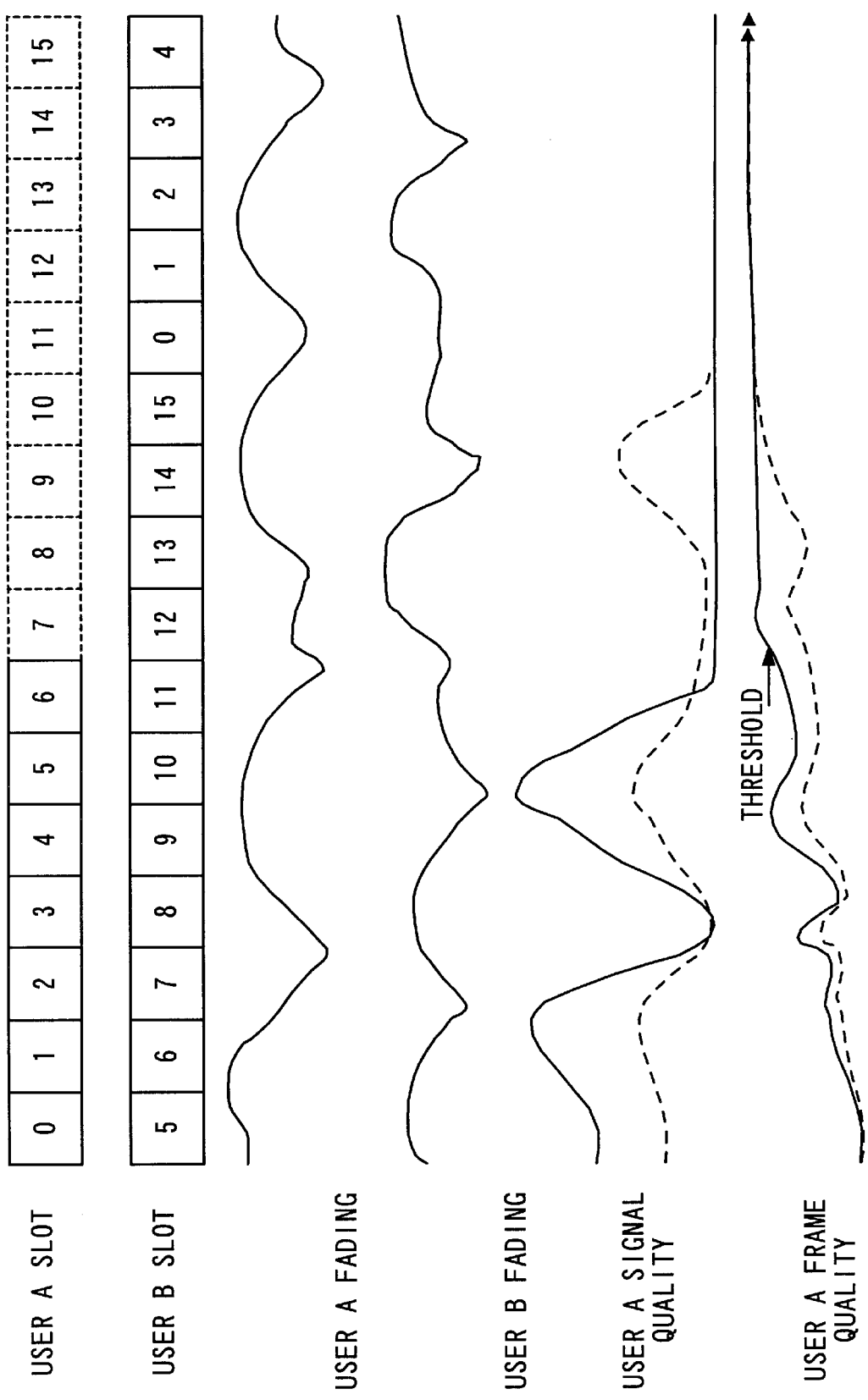
FIG. 14 is a diagram to explain reception qualities in the CDMA radio communication apparatus according to Embodiment 4.
Figure 15:
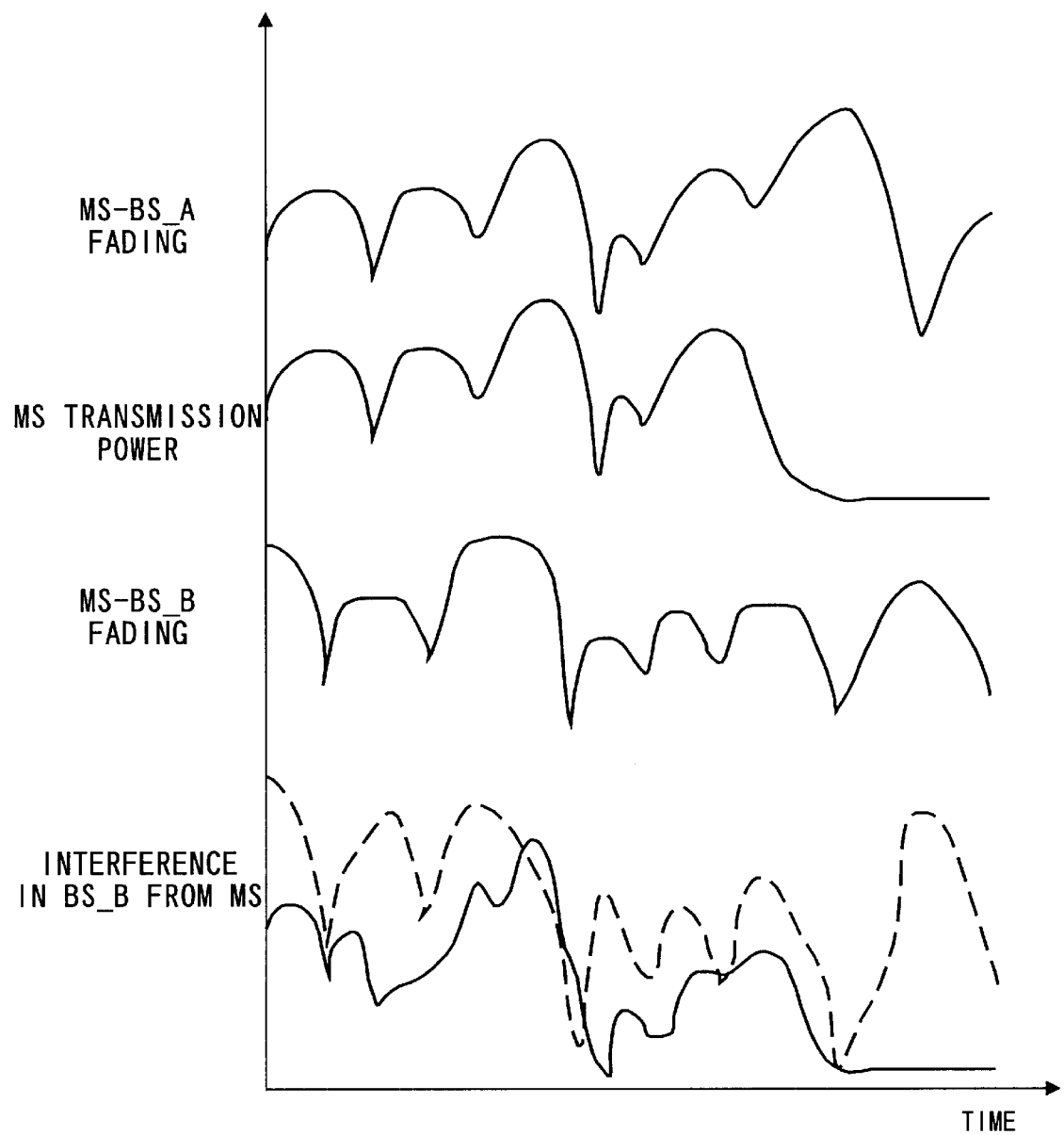
FIG. 15 is a diagram to explain interference amounts in the CDMA radio communication apparatus according to Embodiment 4.

A specific example is described using FIG. 14 and FIG. 15. In FIG. 14, when it is assumed that the spreading factor is 16 and the total symbol number is N, 0th chips to 15th chips for symbols 0 to N−1 are arranged respectively in user A slots 0 to 15 after chip interleaving.

Qualities do not vary largely in a slot, but vary largely depending on slots, due to user A fading. In this system where the inverse transmission power control is performed, as illustrated in FIG. 14, with respect to signal with high quality (upper part of user A signal quality), increase of transmission power introduces great increase of quality, while with respect to signal with low quality (lower part of user A signal quality), decrease of transmission power keeps almost the same quality.

Qualities do not vary largely in a slot, but vary largely depending on slots, due to user A fading. In this system, since chip interleaving is performed, chips for one symbol are divided to be assigned for a plurality of slots. Accordingly, the chips for one symbols are arranged both in slots with high signal quality and other slots with low signal quality, the probability that qualities of all chips deteriorate is extremely low, even though the inverse transmission power control is performed.

By that spread chip interleaved signal is deinterleaved and then despread, it is possible to obtain the improvement effect in the same manner as in equal-gain combining diversity with 16 branches, while decreasing fluctuations of qualities between slots.

In this point, in the case of using the transmission power decrement control of Embodiment 3 together, transmission power is controlled to be increased as reception quality is higher until user A frame quality exceeds a predetermined threshold, and to be decreased when user A frame quality exceeds a predetermined threshold. According to the aforementioned processing, since user A signals are transmitted with higher power in a time period where the quality is high, the signal quality exceeds the threshold earlier than in Example 3. As a result, the transmission power decrement is performed earlier.

For example, as illustrated in FIG. 14, in the case where the slot order difference between user A and user B are 5 slots, when the transmission power is decreased at the time the user A frame quality exceeds the threshold, user A signals do not interfere in slots 0 to 4 of user B. As a result, it is expected that the user B frame quality exceeds the threshold faster. Further, the transmission power decrement is performed earlier than Example 3 by the inverse transmission power control. Therefore, the user A frame quality is further improved, and it is thereby possible to decrease the system total transmission power largely. In addition, the total transmission power is decreased even though the transmission power decrement control is not performed.

Furthermore, as illustrated in FIG. 15, with respect to interference in BS_B caused by user A signal, it is possible to decrease an interference amount (solid line in FIG. 15) as compared with the interference in Embodiment 1 (dotted line in FIG. 12) by the inverse transmission power performed by BS_A to user A. Still furthermore, since it is possible to achieve no transmission power in latter half of the frame by using the transmission power decrement control together, the total transmission power can be further decreased.

Thus, according to the radio communication system provided with the CDMA radio communication apparatus of Embodiment 4, it is possible to further decrease total transmission power and thereby increase the system capacity than Embodiments 1 to 3.

Embodiment 5

Figure 16:
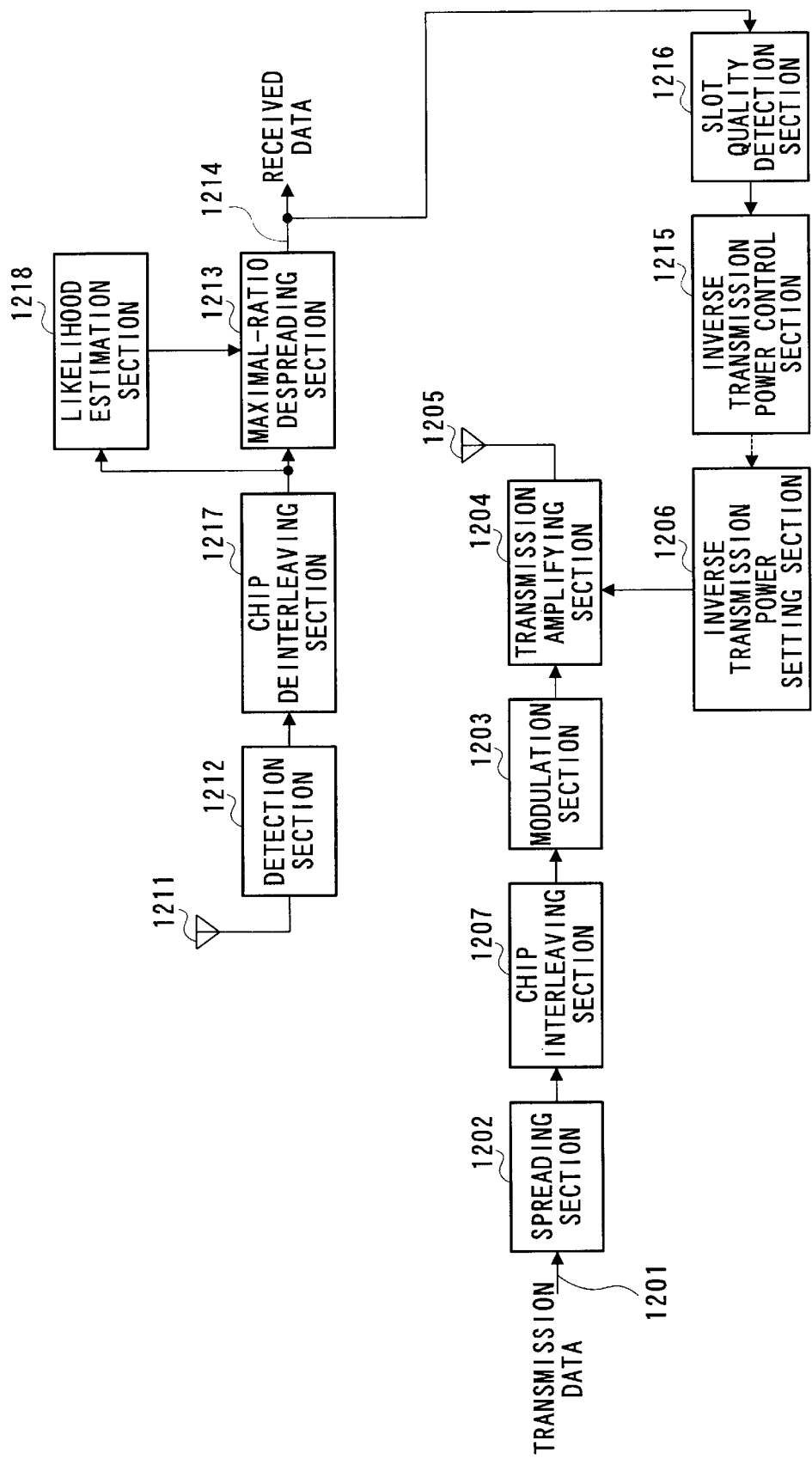
FIG. 16 is a block diagram illustrating configuration of a CDMA radio communication apparatus according to Embodiment 5 of the present invention.

FIG. 16 is a block diagram illustrating a configuration of a CDMA radio communication apparatus according to Embodiment 5 of the present invention.

In a transmitter, transmission data 1201 is spread at spreading section 1202, and then subjected to chip interleaving processing at chip interleaving section 1207. The interleaved signal is modulated at modulation section 1203, amplified at transmission amplifying section 1204 and then transmitted from transmission antenna 1205.

In a receiver, a signal received at reception antenna 1211 is detected at detection section 1212, and then subjected to inverse arrangement to the chip interleaving at the transmission side, i.e., deinterleaving, at chip deinterleaving section 1217. The deinterleaved data is combined at maximal-ratio despreading section 1213 to obtain received data 1214. Maximal-ration despreading section 1213 performs weighting on the deinterleaved data based on likelihood estimated form the deinterleaved data at likelihood estimation section 1218.

Further, the slot quality of received data 1214 is detected at slot quality detection section 1216. Based on the detection result, inverse transmission power control section 1215 generates a signal indicative of inverse transmission power control to transmit to the transmitter. In the transmitter, based on the control signal, inverse transmission power setting section 1206 performs inverse transmission power setting and controls an amplitude for transmission amplifying section 1204.

Operations in the CDMA radio communication apparatus configured as described above are the same as those in Embodiment 4 except that likelihood estimation is performed. In other words, likelihood estimation performed by maximal-ratio despreading section 1213 and likelihood estimation section 1218 is added to functions of the CDMA radio communication apparatus according to Embodiment 4. It is thereby possible to obtain higher S/N ratio as compared to combining of chip deinterleaved signals without weighting, enabling better received data 1214 to be obtained. The reception quality is thus improved. As a result, transmission power is decreased and the total transmission power is thereby further reduced.

Thus, according to the radio communication system provided with the CDMA radio communication apparatus of Embodiment 5, it is possible to further decrease total transmission power and thereby increase the system capacity than Embodiments 1 to 4.

The Embodiments 1 to 5 describe about the case where the interleaving is performed according to time, however the same effect is obtained in the case where interleaving is performed according to frequency. Further, it is preferable to combine the embodiments 1 to 5 properly to practice.

Embodiment 6

Figure 17:
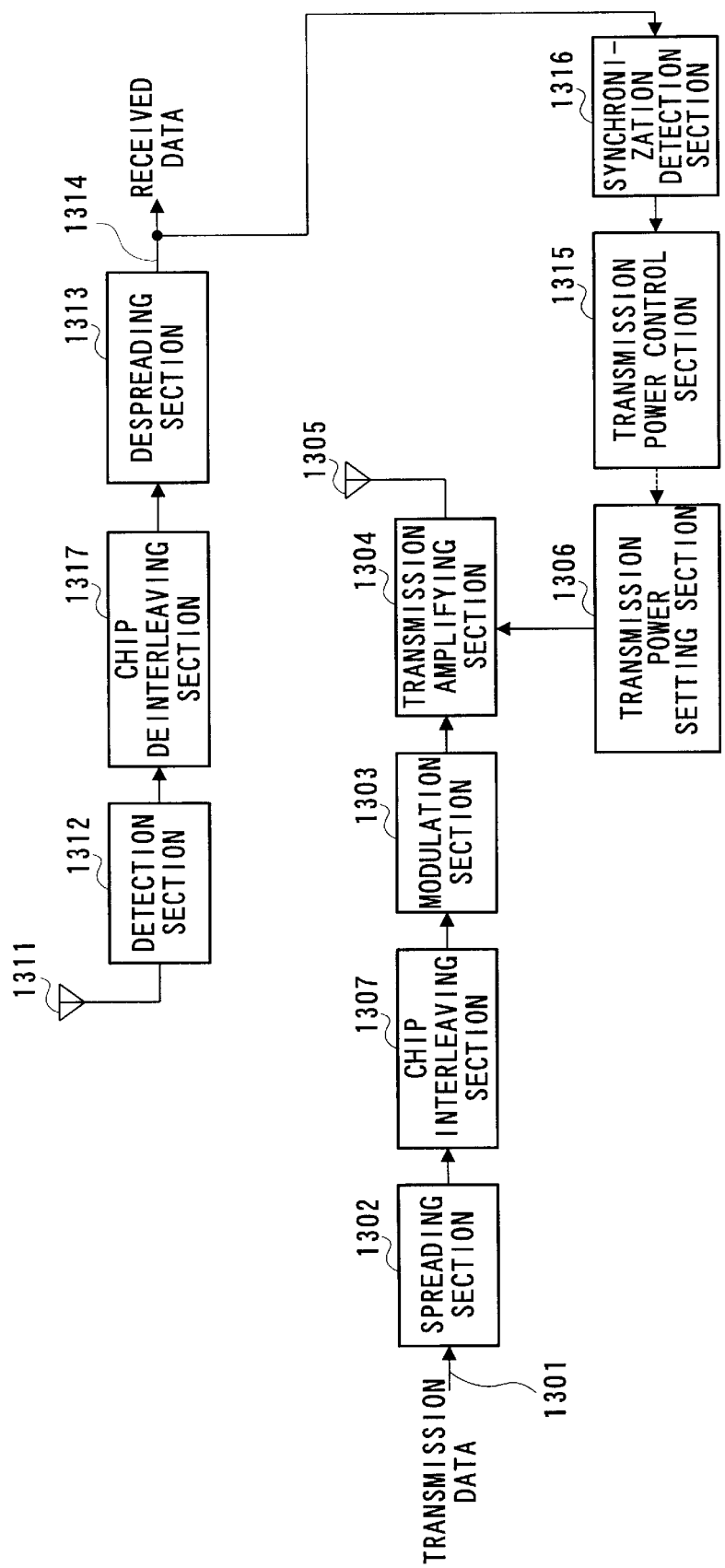
FIG. 17 is a block diagram illustrating a configuration of a CDMA radio communication apparatus according to Embodiment 6 of the present invention.

FIG. 17 is a block diagram illustrating a configuration of a CDMA radio communication apparatus according to Embodiment 6 of the present invention.

In a transmitter, transmission data 1301 is spread at spreading section 1302, and then subjected to chip interleaving processing at chip interleaving section(CI) 1307. The interleaved signal is modulated at modulation section (MOD) 1303, amplified at transmission amplifying section (TA) 1304 and then transmitted from transmission antenna 1305.

In a receiver, a signal received at reception antenna 1311 is detected at detection section 1312, and then subjected to inverse arrangement to the chip interleaving at the transmission side, i.e., deinterleaving, at chip deinterleaving section (CD) 1317. The deinterleaved data is combined at despreading section 1313 to obtain received data 1314.

Further, an arrival time of received data 1314 is measured at synchronization detection section(SYNC) 1316. Transmission power control section 1315 generates, with respect to a user of which arrival time in a base station communicating with the above-described receiver is late, a control signal for transmission time length and transmission power so that the reception is completed in a predetermined time and the total transmission power is held constant so as to transmit to the transmitter. In the transmitter, based on the control signal, transmission power setting section(TPS) 1306 performs settings of transmission time and transmission power and based on the setting values, controls an amplitude for transmission amplifying section 1304 and transmission time.

In the CDMA radio communication apparatus configured as described above, with respect to a user of which arrival time is late, the transmission time and transmission power are controlled so that the reception is completed in a predetermined time, while holding the total transmission power constant.

With respect to a user of which arrival time is late, since the transmission time is determined so that the reception is completed in a predetermined time, the reception time becomes short, and therefore the transmission power is increased to cancel the effect by the short reception time. Because transmission signals are subjected to chip interleaving, the decoding is possible when frame quality with a predetermined level is satisfied even if a part of burst is not received.

Figure 18:
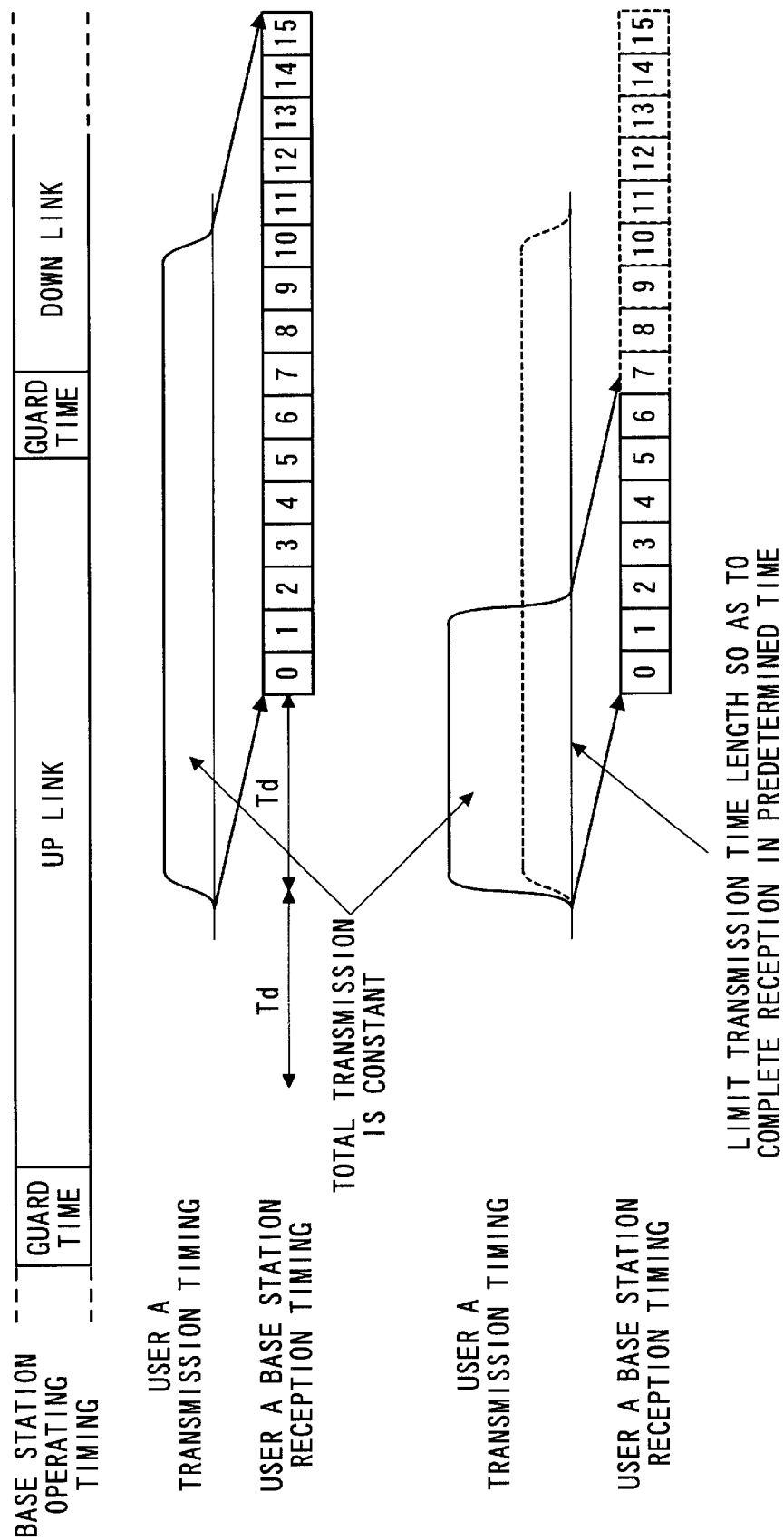
FIG. 18 is a diagram to explain operations in the CDMA radio communication apparatus according to Embodiment 6.

A specific example is described using FIG. 18. In FIG. 18, when it is assumed that the spreading factor is 16 and the total symbol number is N, 0th chips to 15th chips for symbols 0 to N−1 are arranged respectively in user A slots 0 to 15 after chip interleaving. It is further assumed that one frame contains slots 0 to 15.

In FIG. 18, a first row illustrates operation timing of base station, a second row illustrates up link transmission timing of user A, and a third row illustrates reception timing of user A transmitted signal in the base station.

It is assumed that the signal from user A is not completed in a predetermined time. In this case, as illustrated in a fourth row, the transmission time length is controlled so that the reception is completed in a predetermined time. The transmission time length is determined corresponding to the measured arrival time and the operation timing of the base station. In this point, the transmission power is increased to transmit under the fixed total transmission power, in order to compensate the shortening of the transmission time. When the transmission power is high, since it is expected that the frame quality with a predetermined level, necessary for decoding, is satisfied in a short time, it is possible to complete the reception in a predetermined time.

As described above, according to a radio communication system provided with the CDMA radio communication apparatus according to Embodiment 6, the receiver measures an arrival time of reception data, and with respect to a transmitter having a late arrival time, the transmission time length is controlled while the transmission power is increased so that the reception is completed in a predetermined time and the total transmission power is held constant. Therefore, it is possible to complete the reception in a predetermined time, while satisfying the frame quality with a predetermined level, necessary for decoding, in a short time with high transmission power. The aforementioned processing enables all users (transmitters) to complete the receptions in a base station in a predetermined time.

Embodiment 7

Figure 19:
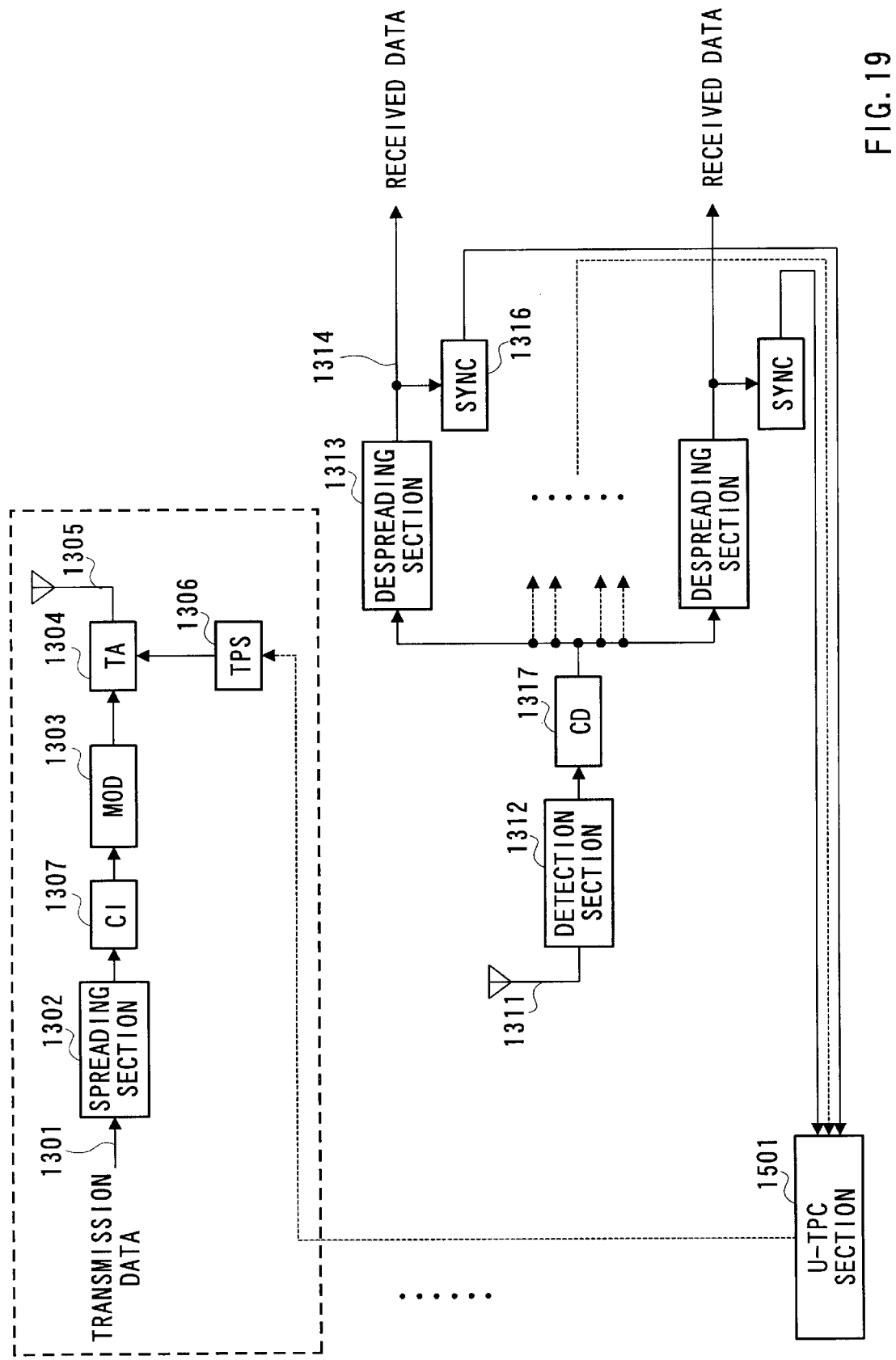
FIG. 19 is a block diagram illustrating a configuration of a CDMA radio communication apparatus according to Embodiment 7 of the present invention.

FIG. 19 is a block diagram illustrating a configuration of a CDMA radio communication apparatus according to Embodiment 7 of the present invention.

Operations in a transmitter and a receiver are the same as those in Embodiment 6 except that transmission time length control is performed to a user of which arrival time is fast. Based on arrival time information measured from synchronization detection for every user, all users transmission power control section 1501 (herein after referred to as U-TPC section 1501) controls transmission time lengths of all users.

Operations in the CDMA radio communication apparatus configured as described above is described using FIG. 20.

Figure 20:
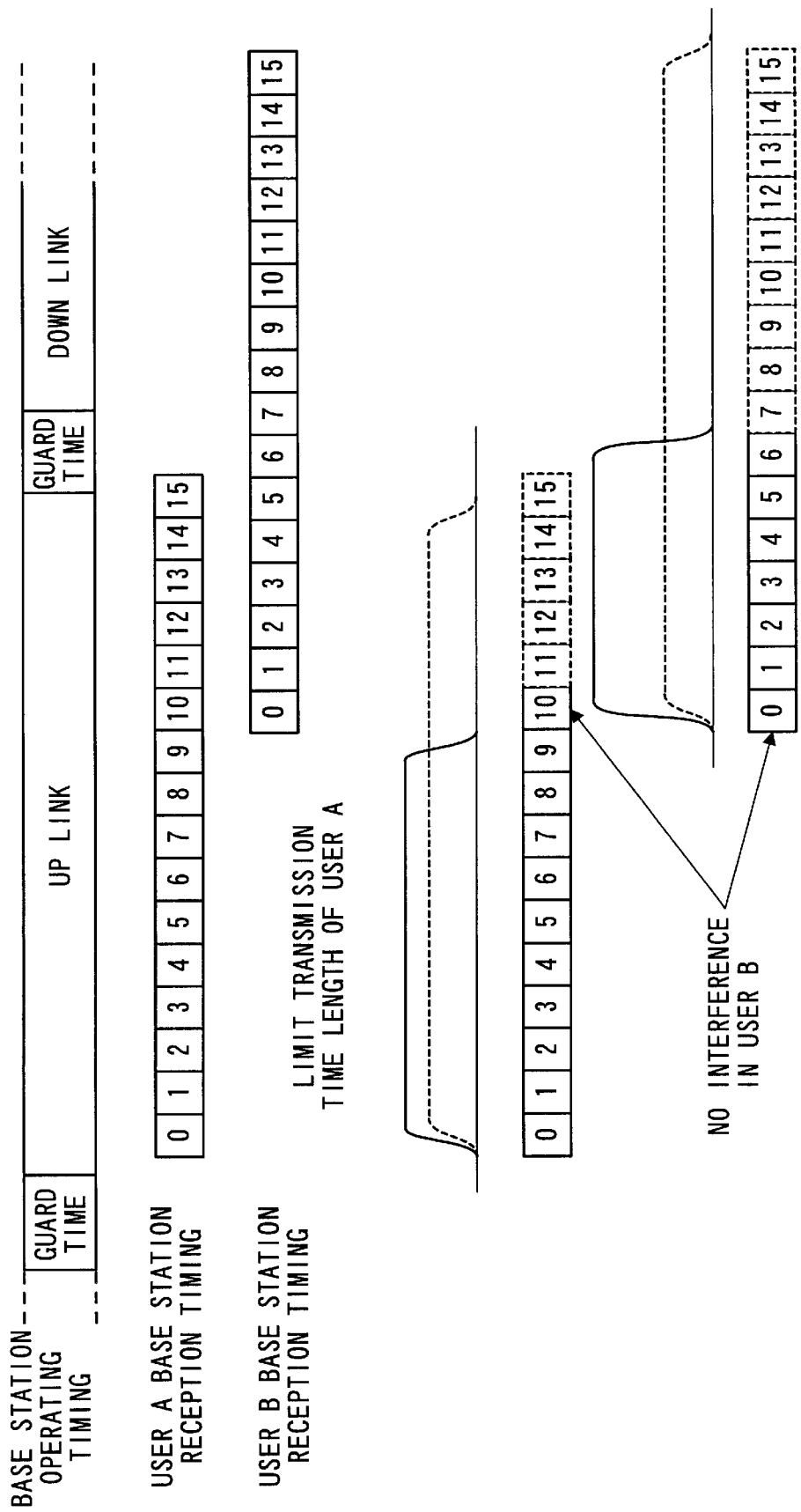
FIG. 20 is a diagram to explain operations in the CDMA radio communication apparatus according to Embodiment 7.

In FIG. 20, when it is assumed that the spreading factor is 16 and the total symbol number is N, 0th chips to 15th chips for symbols 0 to N−1 are arranged respectively in user A slots 0 to 15 after chip interleaving. It is further assumed that one frame contains slots 0 to 15.

In FIG. 20, a first row illustrates operation timing of base station, a second row illustrates up link transmission timing of user A, and a third row illustrates reception timing of user A transmitted signal in the base station.

In addition, it is assumed that the timing in the figure is in a reception side. Further, it is assumed that the base station (receiver) communicates with only user A and user B, in order to simplify the description. Furthermore, it is assumed that the reception from user A is completed in a predetermined time in the base station, but the reception from user B is not completed in a predetermined time in the base station.

In this case, with respect to user B, it is possible to control the reception to be completed in a predetermined time by transmitting in the same manner as described in Embodiment 6. Further, with respect to user A, the transmission time length is controlled so that the reception is completed before a following user starts receiving, while the transmission power is increased in order to compensate the shortening of the reception time under the fixed total transmission power.

As described above, according to a radio communication system provided with the CDMA radio communication apparatus according to Embodiment 6, an interference amount, caused by transmission signals from a transmitter of user A, in transmission signals from a transmitter of user B is reduced. Accordingly, it is possible to decrease transmission power of user B for satisfying a predetermined frame quality than Embodiment 6. It is thus expected that the receptions can be completed in a predetermined time, while reducing the total transmission power for satisfying a predetermined quality for all users.

Embodiment 8

Figure 21:
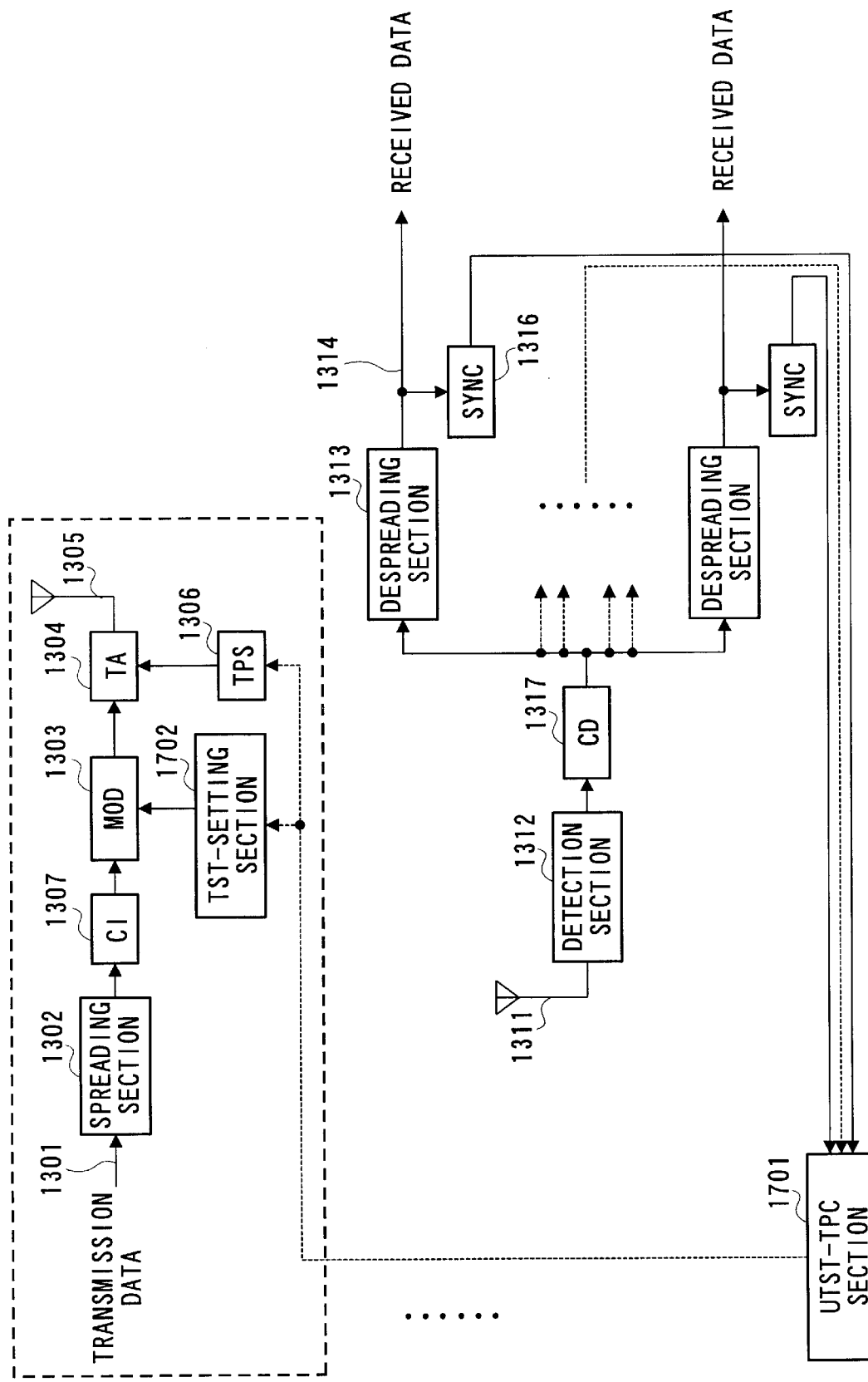
FIG. 21 is a block diagram illustrating a configuration of a CDMA radio communication apparatus according to Embodiment 8 of the present invention.

FIG. 21 is a block diagram illustrating a configuration of a CDMA radio communication apparatus according to Embodiment 8 of the present invention.

In a transmitter, transmission data 1301 is spread at spreading section 1302, and then subjected to chip interleaving processing at chip interleaving section 1307. The interleaved signal is modulated at modulation section 1303, amplified at transmission amplifying section 1304 and then transmitted from transmission antenna 1305.

In a receiver, a signal received at reception antenna 1311 is detected at detection section 1312, and then subjected to inverse arrangement to the chip interleaving at the transmission side, i.e., deinterleaving, at chip deinterleaving section 1317. The deinterleaved data is combined at despreading section 1313 to obtain received data 1314.

Further, an arrival time of received data 1314 is measured at synchronization detection section 1316. All users transmission starting time transmission power control section 1701 (hereinafter referred to as UTST-TPC section 1701) generates a control signal for providing a delay in transmission starting time of users having no difference in arrival time, and a signal for controlling transmission time length and transmission power to each user in the same manner as in Embodiments 6 and 7.

Based on the control signals, transmission power setting section 1306 sets the transmission time length and transmission power, and transmission starting time setting section 1702 (herein after referred to as TST-setting section 1702) provides a delay in the transmission starting time.

Operations in the CDMA radio communication apparatus with the configuration as describe above is the same as in Embodiment 6 except that control of the transmission starting time is performed.

In other words, since the transmission starting time control is performed, it is possible to shift an arrival time intentionally even when there is no difference of arrival time between users, in order to enable interference between users to be reduced. Accordingly, transmission is performed freely with efficiency provided, and further flexible control can be performed.

Figure 22:
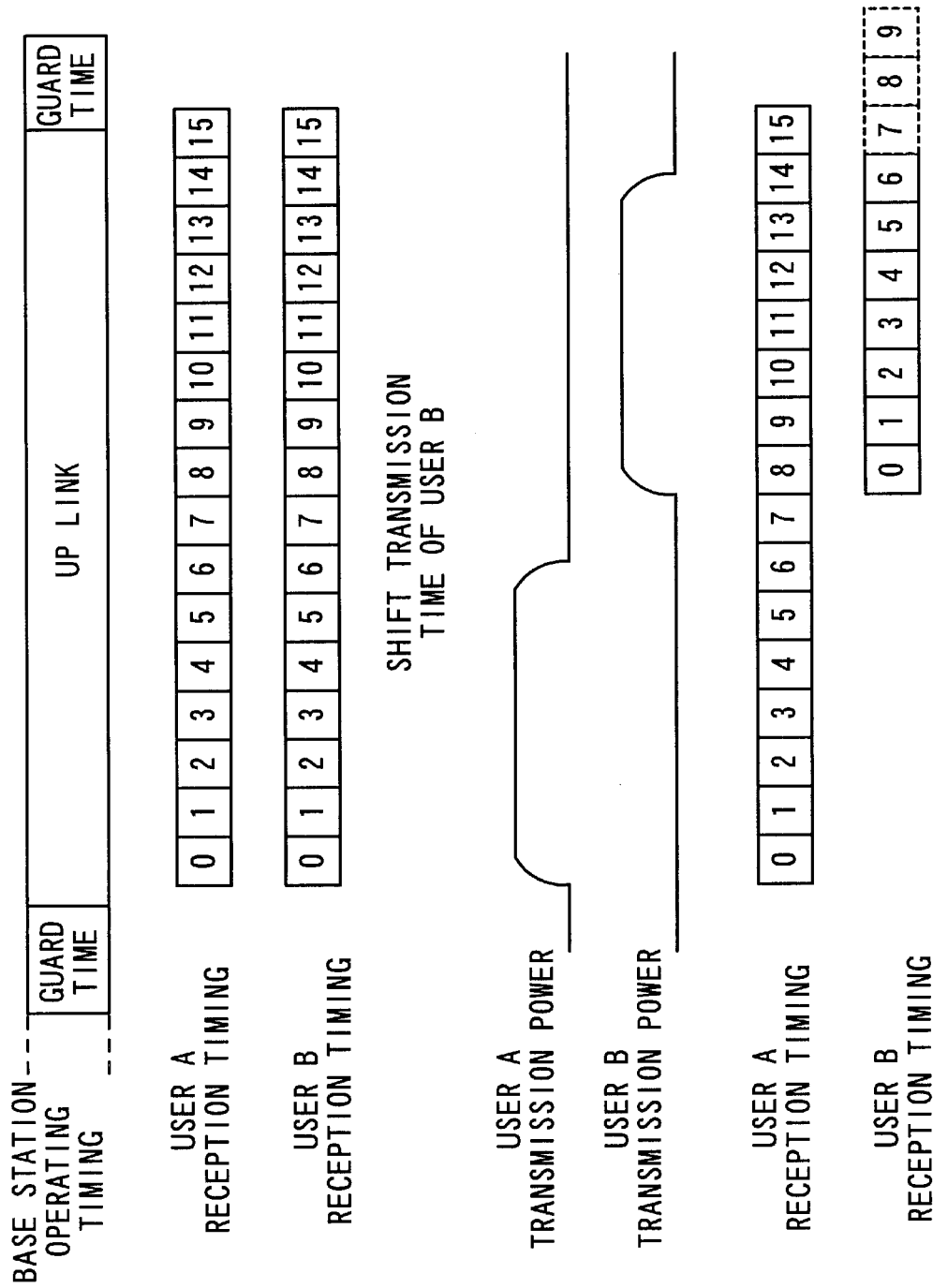
FIG. 22 is a diagram to explain operations in the CDMA radio communication apparatus according to Embodiment 8.

A specific example is described using FIG. 22. In FIG. 22, when it is assumed that the spreading factor is 16 and the total symbol number is N, 0th chips to 15th chips for symbols 0 to N−1 are arranged respectively in user A slots 0 to 15 after chip interleaving. It is further assumed that one frame contains slots 0 to 15.

In addition, each timing in FIG. 22 is a base station side (reception side).

It is furthermore assumed that user A and user B communicate with the base station and there is almost no difference between reception timings from user A and user B in the base station. In this case, it is possible to reduce interference by user A in transmission signals for user B by providing a delay in transmission starting time of user B.

As described above, according to a radio communication system provided with the CDMA radio communication apparatus according to Embodiment 8, since transmission starting time of a transmitter for each user is controlled to be shifted, it is possible to shift an arrival time intentionally even when there is no difference of arrival time between users, resulting in the reduction of interference between users. Transmission is thus provided with flexibility, and it is thereby possible to transmit signals efficiently.

Embodiment 9

Figure 23:
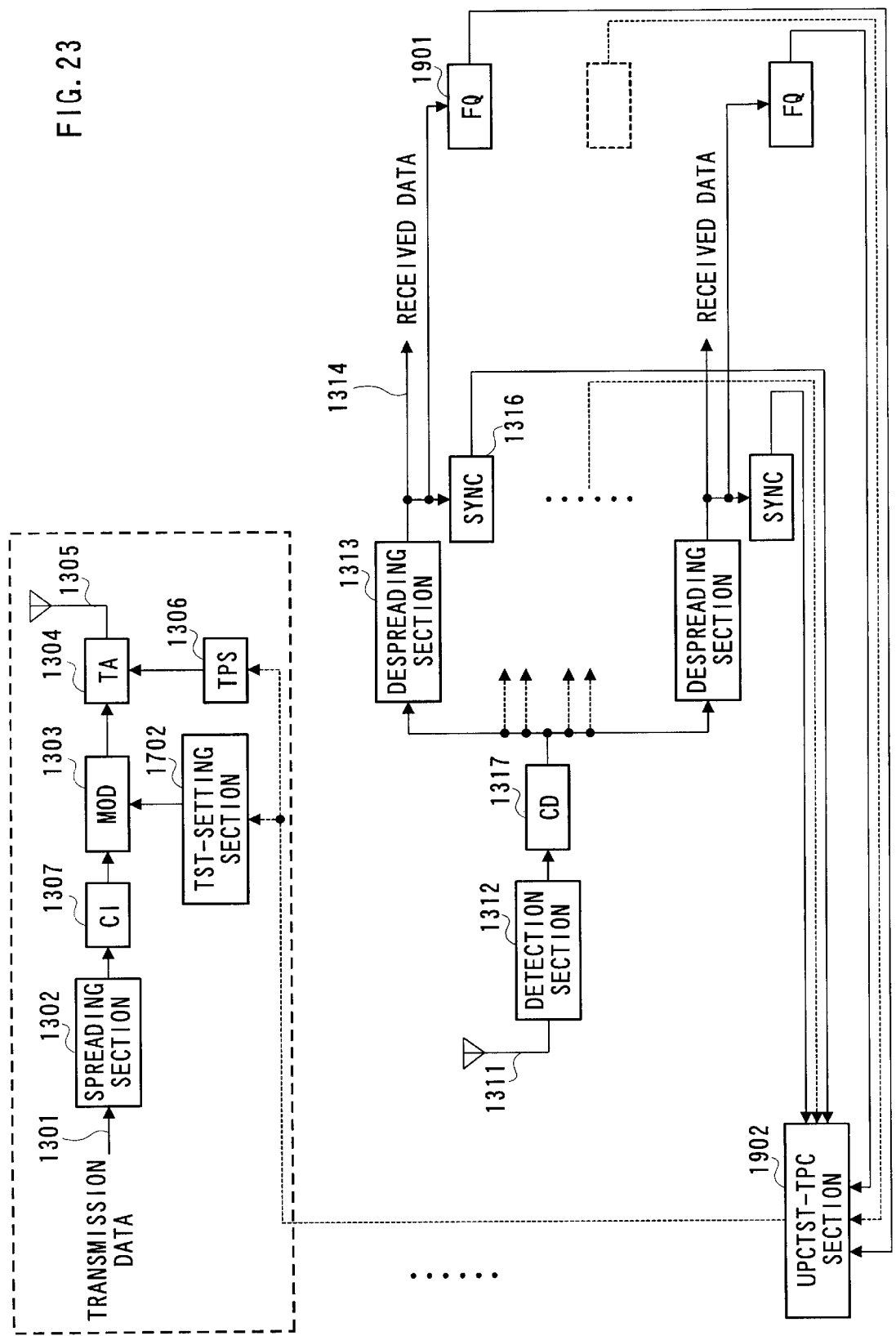
FIG. 23 is a block diagram illustrating a configuration of a CDMA radio communication apparatus according to Embodiment 9 of the present invention.

FIG. 23 is a block diagram illustrating a configuration of a CDMA radio communication apparatus according to Embodiment 9 of the present invention.

In a transmitter, transmission data 1301 is spread at spreading section 1302, and then subjected to chip interleaving processing at chip interleaving section 1307. The interleaved signal is modulated at modulation section 1303, amplified at transmission amplifying section 1304 and then transmitted from transmission antenna 1305.

In a receiver, a signal received at reception antenna 1311 is detected at detection section 1312, and then subjected to inverse arrangement to the chip interleaving at the transmission side, i.e., deinterleaving, at chip deinterleaving section 1317. The deinterleaved data is combined at despreading section 1313 to obtain received data 1314.

Further, with respect to received data 1314, an arrival time of the signal is measured at synchronization detection section 1316, and frame quality is measured at frame quality detection section(FQ) 1901. All users power control transmission starting time transmission power control section 1902 (hereinafter referred to as UPCTST-TPC section 1902) generates a control signal for providing a delay in transmission starting time of users having no difference in arrival time, and a signal for controlling transmission time length and transmission power and another signal for power control. Operations in CDMA radio communication apparatus with the configuration as described above are the same as in those in Embodiments 6 to 8 except that the power control is executed.

In addition, the power control is includes open loop power control, closed loop power control, or combinations of both power controls .

As described above, according to a radio communication system provided with the CDMA radio communication apparatus according to Embodiment 9, it is possible to improve reception qualities by using the power control for variations due to fading.

Further, Embodiment 9 provides Embodiment 8 with power control to improve performance, and it is preferable to apply Embodiment 9 to any one of Embodiments 6 to 8 to improve respective reception qualities.

Embodiment 10

Figure 24:
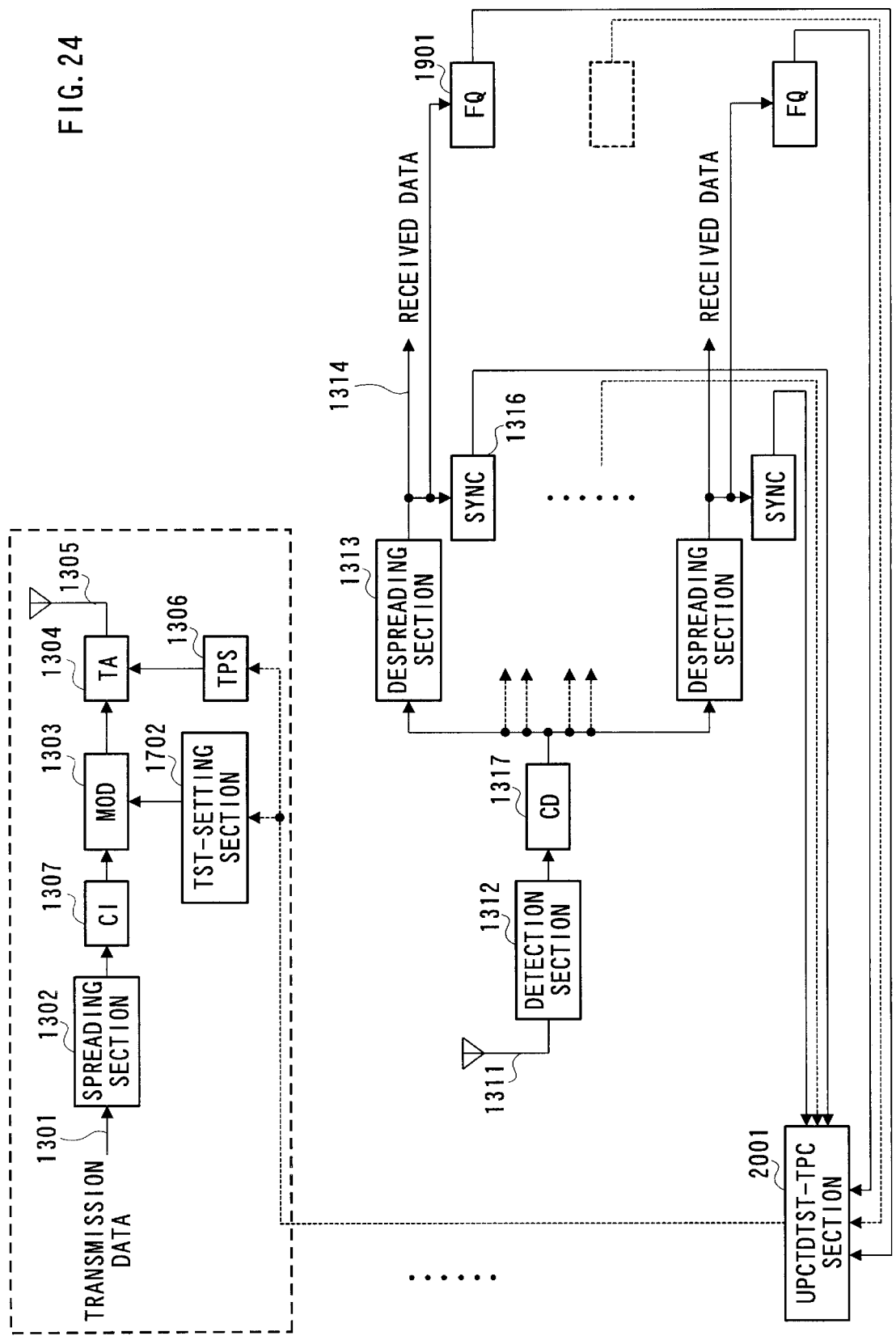
FIG. 24 is a block diagram illustrating a configuration of a CDMA radio communication apparatus according to Embodiment 10 of the present invention.

FIG. 24 is a block diagram illustrating a configuration of a CDMA radio communication apparatus according to Embodiment 10 of the present invention.

In a transmitter, transmission data 1301 is spread at spreading section 1302, and then subjected to chip interleaving processing at chip interleaving section 1307. The interleaved signal is modulated at modulation section 1303, amplified at transmission amplifying section 1304 and then transmitted from transmission antenna 1305.

In a receiver, a signal received at reception antenna 1311 is detected at detection section 1312, and then subjected to inverse arrangement to the chip interleaving at the transmission side, i.e., deinterleaving, at chip deinterleaving section 1317. The deinterleaved data is combined at despreading section 1313 to obtain received data 1314.

Further, with respect to received data 1314, an arrival time of the signal is measured at synchronization detection section 1316, and frame quality is measured at frame quality detection section 1901. All users power control transmission discontinuing transmission starting time transmission power control section 2001 (hereinafter referred to as UPCTDTST-TPC section 2001) generates a control signal for providing a delay in transmission starting time of users having no difference in arrival time, and a signal for controlling transmission time length and transmission power and another signal for power control.

Figure 25:
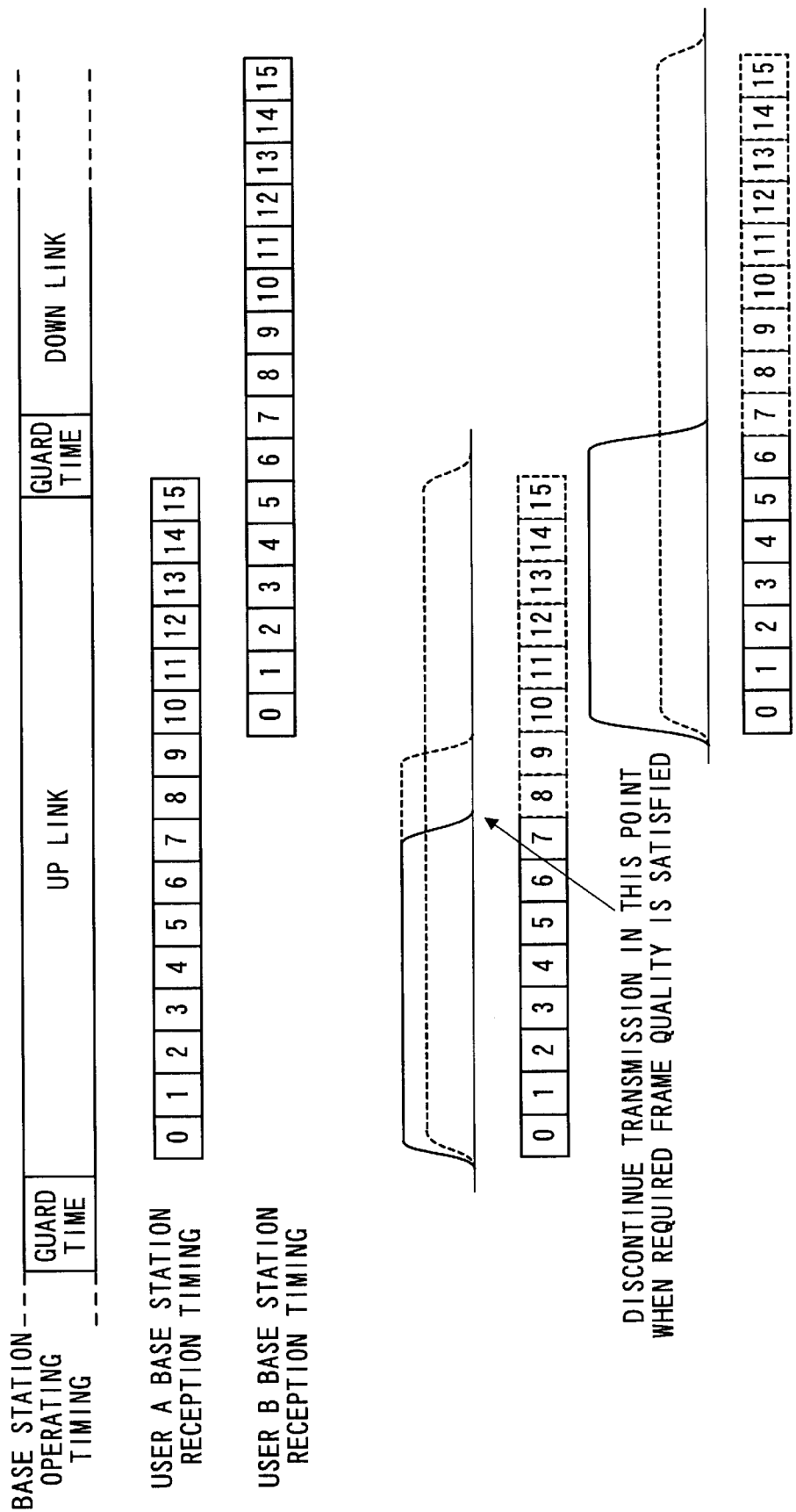
FIG. 25 is a diagram to explain operations in the CDMA radio communication apparatus according to Embodiment 10.

In this point, when the detection result of frame quality indicates a signal which satisfies a predetermined frame quality in relatively short time as compared to limited transmission time length, the transmission of the signal is discontinued at the time the frame quality is satisfied, as illustrated in FIG. 25, because the reception is performed with excess quality.

According to the aforementioned processing, it is possible to reduce interference in other users and also reduce the total transmission power of a mobile station (transmitter), resulting in battery saving. Operations in the CDMA radio communication apparatus with the above configuration as described above is the same as those in Embodiments 6 to 9 except that transmission is discontinued.

As described above, according to a radio communication system provided with the CDMA radio communication apparatus according to Embodiment 10, since transmission is discontinued at the time a predetermined frame quality is satisfied in any one of Embodiments 6 to 9, it is possible to reduce interference in other users and suppress the total transmission power, thereby enabling a mobile station to achieve battery saving.

Embodiment 10 provides Embodiment 9 with the function of discontinuing transmission, and it is preferable to apply Embodiment 10 to any one of Embodiments 6 to 9 in order to reduce both interference in other users and power consumption of mobile station.

Embodiment 11

Figure 26:
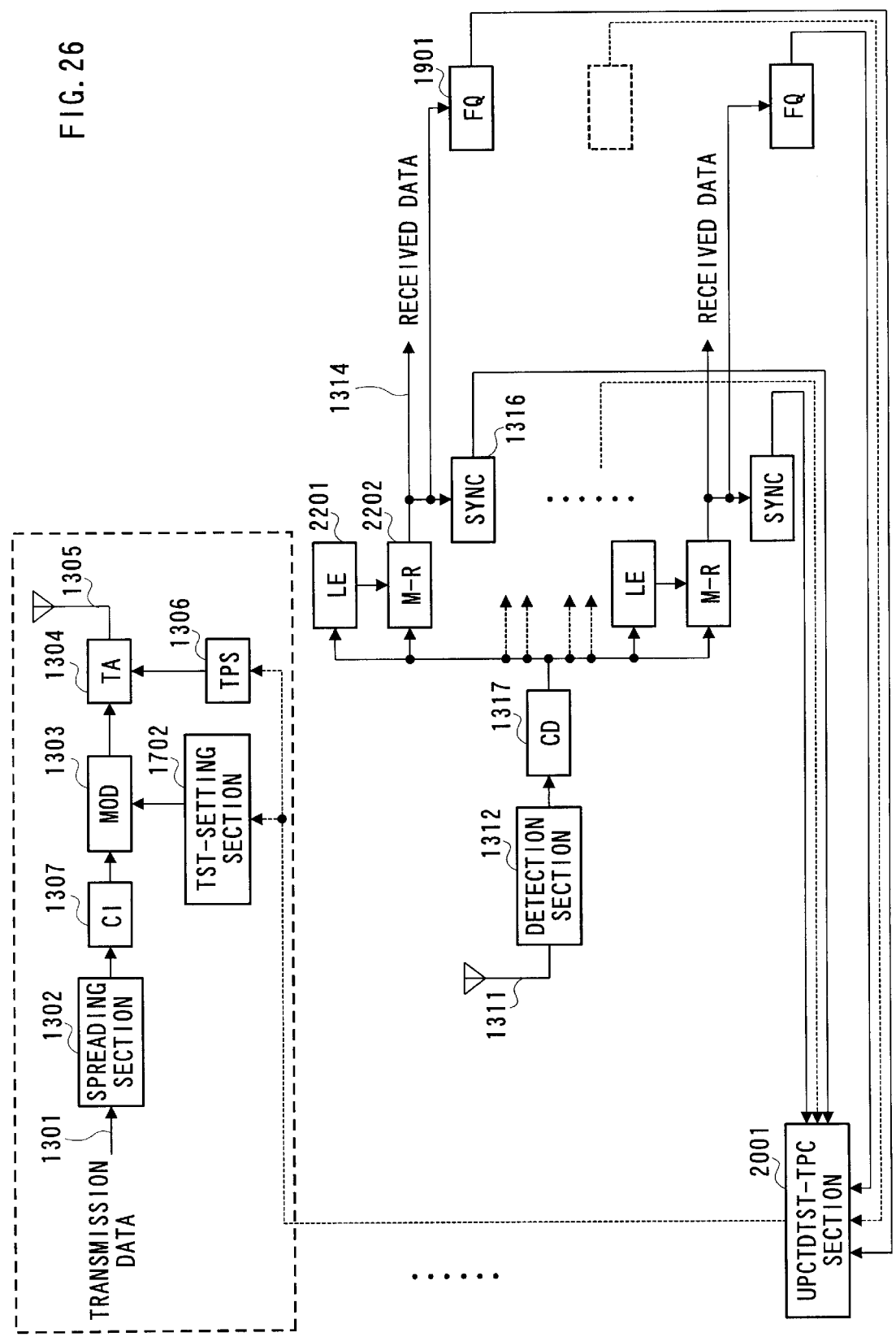
FIG. 26 is a block diagram illustrating a configuration of a CDMA radio communication apparatus according to Embodiment 11 of the present invention.

FIG. 26 is a block diagram illustrating a configuration of a CDMA radio communication apparatus according to Embodiment 11 of the present invention.

In FIG. 26, the configuration is the same as in Embodiment 10 except likelihood estimation section(LE) 2201 and maximal-ratio despreading section(M-R) 2202.

Transmission data 1301 is spread at spreading section 1302, and then subjected to chip interleaving processing at chip interleaving section 1307. The interleaved signal is modulated at modulation section 1303, amplified at transmission amplifying section 1304 and then transmitted from transmission antenna 1305.

In a receiver, a signal received at reception antenna 1311 is detected at detection section 1312, and then subjected to inverse arrangement to the chip interleaving at the transmission side, i.e., deinterleaving, at chip deinterleaving section 1317. The deinterleaved data is combined at maximal-ratio despreading section 2202 to obtain received data 1314.

Based on likelihood estimated from the chip deinterleaved signals in likelihood estimation section 2201, maximal-ratio despreading section 2202 performs weighting on the signals.

According to the aforementioned processing, it is possible to obtain higher S/N ratio than in the case of combining without weighting and as a result, received data 1314 is obtained with better qualities. Further with respect to received data 1314, an arrival time of the signal is measured at synchronization detection section 1316, and frame quality is measured at frame quality detection section 1901. Based on the obtained results, UPCTDTST-TPC section 2001 generates control signals for transmission length time with discontinued transmission considered, transmission starting time, transmission power, and power control to transmit to a transmission side.

Based on the control signals, transmission power setting section 1306 performs setting of transmission time length and transmission power, and TST-setting section 1702 provides a delay in transmission starting time.

As described above, according to a radio communication system provided with the CDMA radio communication apparatus according to Embodiment 11, since based on likelihood estimated from the chip deinterleaved signals in likelihood estimation section 2201, maximal-ratio despreading section 2202 combines weighted signals to obtain received data 1314, it is possible to obtain higher SIN ratio than in the case of combining without weighting, resulting in received data 1314 with better qualities.

Further, Embodiment 11 provides Embodiment 10 with maximal-ration despreading section 2202 and likelihood estimation section 2201 to improve performance, and it is preferable to apply Embodiment 11 to any configuration of Embodiments 6 to 10 in order to enable the configuration to improve reception quality.

Embodiment 12

This embodiment will describe about the case of applying chip interleaving processing to transmission of control signal in order to shorten a time necessary for a receiver to identify a user of a transmitter using a control signal transmitted from the transmitter as compared with a conventional radio communication system.

Figure 27:
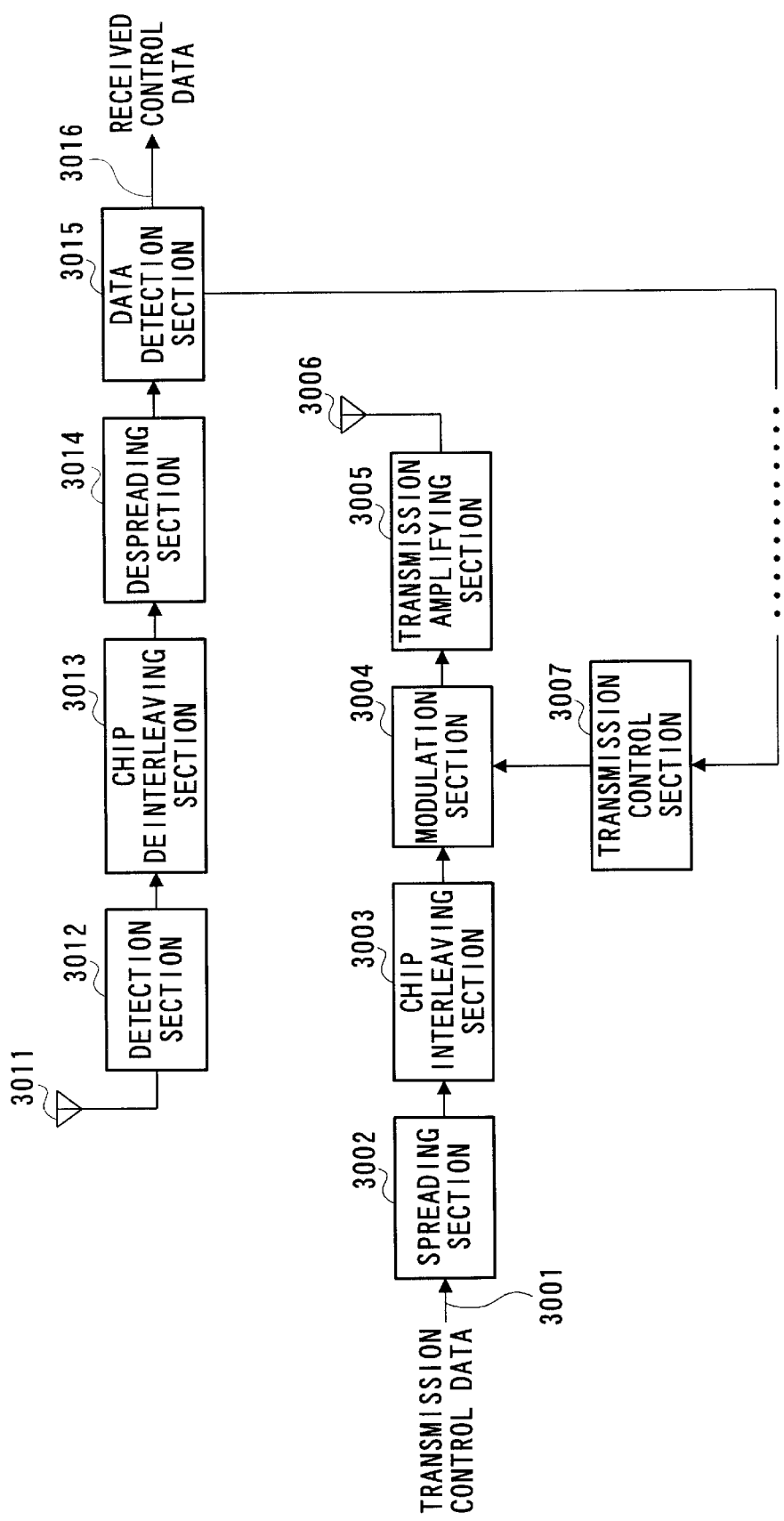
FIG. 27 is a block diagram illustrating a configuration of a CDMA radio communication apparatus according to Embodiment 12 of the present invention.

FIG. 27 is a block diagram illustrating a configuration of a CDMA radio communication apparatus according to Embodiment 12 of the present invention. In addition, in the following description, control data is to identify a user of a transmitter and transmitted in burst transmission from the transmitter using a random access channel to request a call. When a receiver detects the control data and identifies the user of the transmitter, communication is initiated between the transmitter and receiver.

In a transmitter, transmission control data 3001 is spread at spreading section 3002, and then subjected to chip interleaving processing at chip interleaving section 3003. The interleaved signal is modulated at modulation section 3004, amplified at transmission amplifying section 3005 and then transmitted from transmission antenna 3006.

In a receiver, a signal received at reception antenna 3011 is detected at detection section 3012, and then subjected to inverse arrangement to the chip interleaving at the transmission side, i.e., deinterleaving, at chip deinterleaving section 3013. The deinterleaved data is combined at despreading section 3014. Data detection section 3015 detects the combined data with a predetermined power, and thus received control data 3016 is obtained.

Further, when data detection section 3015 detects data, data detection section 3015 transmits a signal for notifying transmission control section 3007 of the detection of data to the transmitter. When the transmitter detects the signal, transmission control section 3007 stops modulation section 3304 from operating so as to discontinue the transmission of control data.

Operations in the CDMA radio communication apparatus configured as described above will be described next.

Transmission control data 3001 is spread at spreading section 3002, and then subjected to chip interleaving processing at chip interleaving section 3003. In this example, the transmission control data is composed of 8 symbols each containing 1 bit data, i.e., composed of 8 bits. In addition, 1 symbol of control data is spread by spreading factor 16.

Accordingly, with respect to chip interleaved spread signals, in slot 1, chip (0-1) of symbol 0, chip (1-1) of symbol 1, chip (2-1) of symbol 2, chip (3-1) of symbol 3, chip (4-1) of symbol 4, chip (5-1) of symbol 5, chip (6-1) of symbol 6, and chip (7-1) of symbol 7 are assigned in this order. Likewise, chip assignment in slots 2–16 is done in the same way as done in slot 1. For example, in slot 2, chip (0-2) of symbol 0, chip (1-2) of symbol 1, chip (2-2) of symbol 2, chip (3-2) of symbol 3, chip (4-2) of symbol 4, chip (5-2) of symbol 5, chip (6-2) of symbol 6, and chip (7-2) of symbol 7 are assigned in this order.

As described above, after spread transmission control data is subjected to chip interleaving, 1st chips to 16th chips for symbols 0 to 7 are arranged respectively in slots 1 to 16. Since the chip interleaving is performed, chips for one symbol are divided to be assigned for a plurality of slots. In other words, slots of spread control signal each contains information on 8 symbols of transmission control data with spreading factor 16.

The transmitter transmits slot 1 of spread control signal to the receiver in burst transmission with power high enough for the receiver to detect.

In the receiver, since slot 1 is transmitted with power high enough, data detection section 3015 detects slot 1. Since each slot of spread control signal contains all information on 8 symbols of transmission control data, received control data 3016 is obtained at the time data detection section 3015 detects data of slot 1.

As described above, according to a CDMA radio communication system provided with the CDMA radio communication apparatus of Embodiment 12, each slot of spread control signal contains all information for identifying a user of a transmitter, the receiver can identify the user of the transmitter when detects a slot which is transmitted first from the transmitter. Accordingly, as compared to a conventional radio communication system in which a transmitter transmits each symbol of transmission control data in one slot, and a receiver needs to receive all the slots to identify a user of the transmitter, it is possible to improve transmission efficiency of transmission control data and shorten a time necessary for the receiver to identify the user of the transmitter. Further, since the transmitter discontinues transmitting control data at the time the receiver detects the control data, it is possible to reduce power consumption of the transmitter.

Embodiment 13

Embodiment 13 will describe the case where chip interleaving is applied to transmission of control data in order to shorten a time necessary for a receiver to identify a user of a transmitter as compared with a conventional radio communication system, when the transmitter transmits control data as increasing power gradually to prevent the power from causing interference in users of other transmitters.

Figure 29:
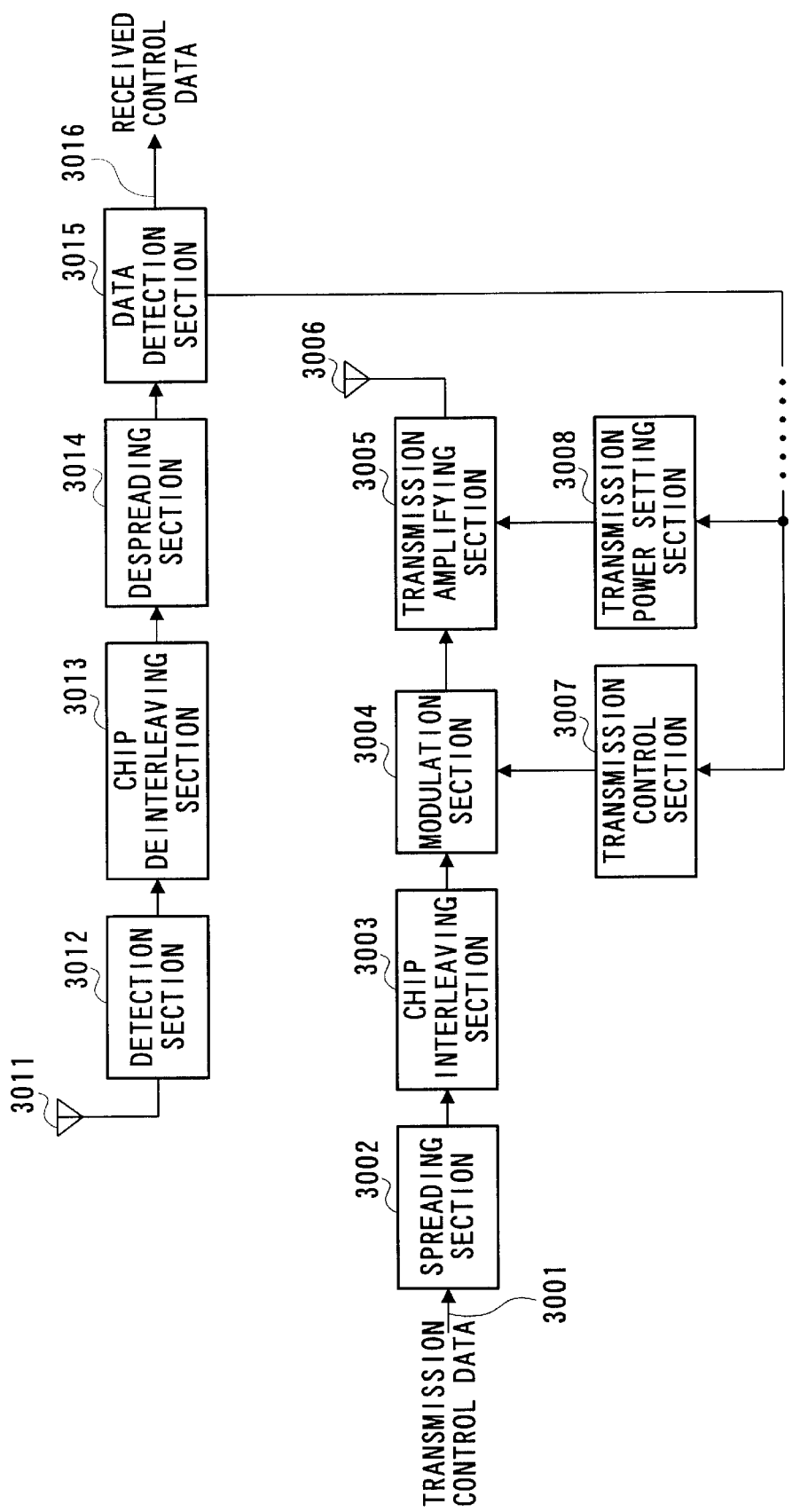
FIG. 29 is a block diagram illustrating a configuration of a CDMA radio communication apparatus according to Embodiment 13 of the present invention.

FIG. 29 is a block diagram illustrating a configuration of a CDMA radio communication apparatus according to Embodiment 13. The basic configuration and operations in the radio communication apparatus of Embodiment 13 are the same as those in Embodiment 12 except that based on a detection signal in data detection section 3015, transmission power setting section 3008 controls an amplitude in transmission amplifying section 3005. Therefore, the different points are only explained below.

Transmission power setting section 3008 controls the amplitude in transmission amplifying section 3005 to be increased when a signal for notifying of data detection is not transmitted from data detection section 3015.

Figure 28:
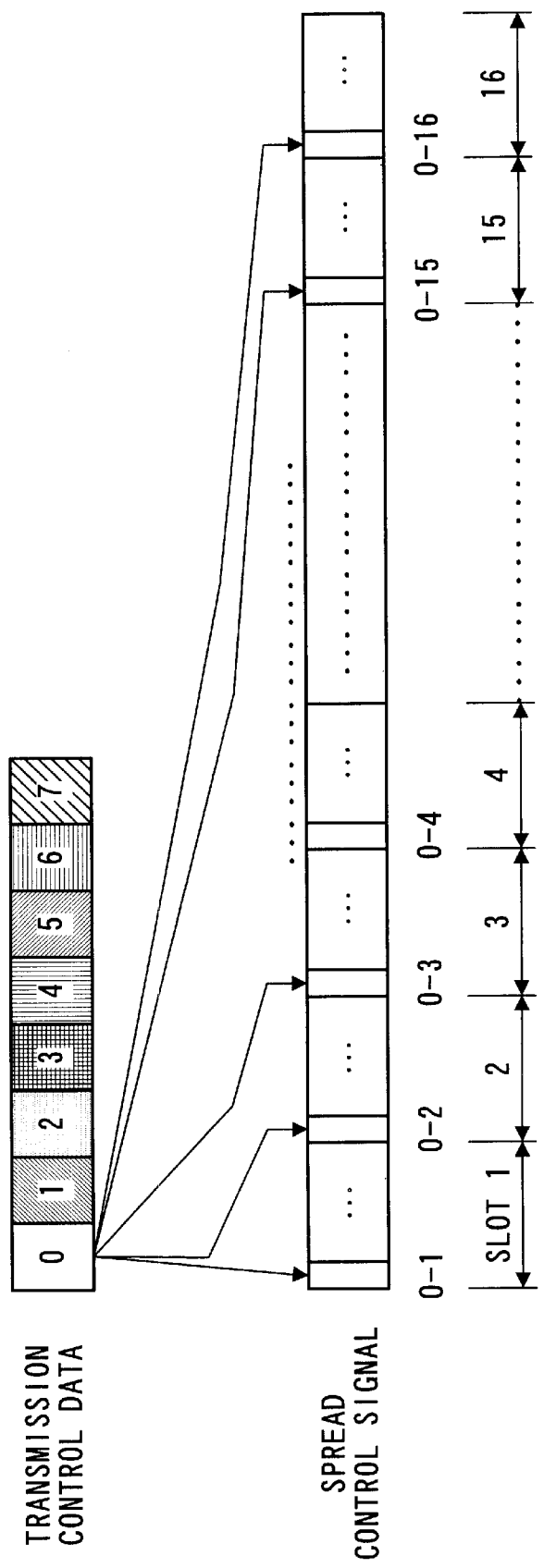
FIG. 28 is an arrangement diagram of chips subjected to chip interleaving in the CDMA radio communication apparatus according to Embodiment 12 of the present invention.

Operations in the CDMA radio communication apparatus configured described above will be described next. The transmitter transmits slots of spread control signal illustrated in FIG. 28 in the order from slot 1 to the receiver in burst transmission. The transmitter transmits slot 1 with power low enough to prevent the signal from causing interference in users of other transmitters.

When data detection section 3015 in the receiver does not detect data because the power of slot 1 data which is combined in despreading section 3014 is low, transmission power setting section 3008 controls the amplitude in transmission amplifying section 3005 to be increased. Slot 2 is thereby transmitted with higher power than slot 1 from the transmitter.

As described above, as the transmitter performs amplitude control, when power of data combined in despreading section 3014 in the receiver reaches a predetermined level, the receiver detects the data in data detection section 3015. Since each slot of spread control signal contains all information on 8 symbols of transmission control data, received control data 3016 is obtained at the time data detection section 3015 detects the data.

As described above, according to a CDMA radio communication system provided with the CDMA radio communication apparatus of Embodiment 13, each slot of spread control signal contains all information for identifying a user of a transmitter, the receiver can identify the user of the transmitter when detects a slot with a predetermined power level. Accordingly, it is possible for a transmitter to increase transmission power for every one slot for each symbol of transmission control data and for a receiver to identify the user of the transmitter when the receiver detects a slot with a predetermined power level and then receives all slots in the predetermined power level. Therefore, as compared to a conventional radio communication system in which a transmitter needs to retransmit a slot, of which power dose not reach a predetermined level, in the predetermined level, the transmission efficiency of transmission control data is improved, and thereby it is possible to reduce the time necessary for the receiver to identify the user of the transmitter. Further, since the transmitter discontinues transmitting control data at the time the receiver detects the control data, it is possible to reduce power consumption of the transmitter.

Embodiment 14

Embodiment 14 will describe a CDMA radio communication apparatus of which a receiver stores control data with less power than a predetermined level sequentially in a buffer in order to shorten a time for a receiver to identify a user of a transmitter.

Figure 30:
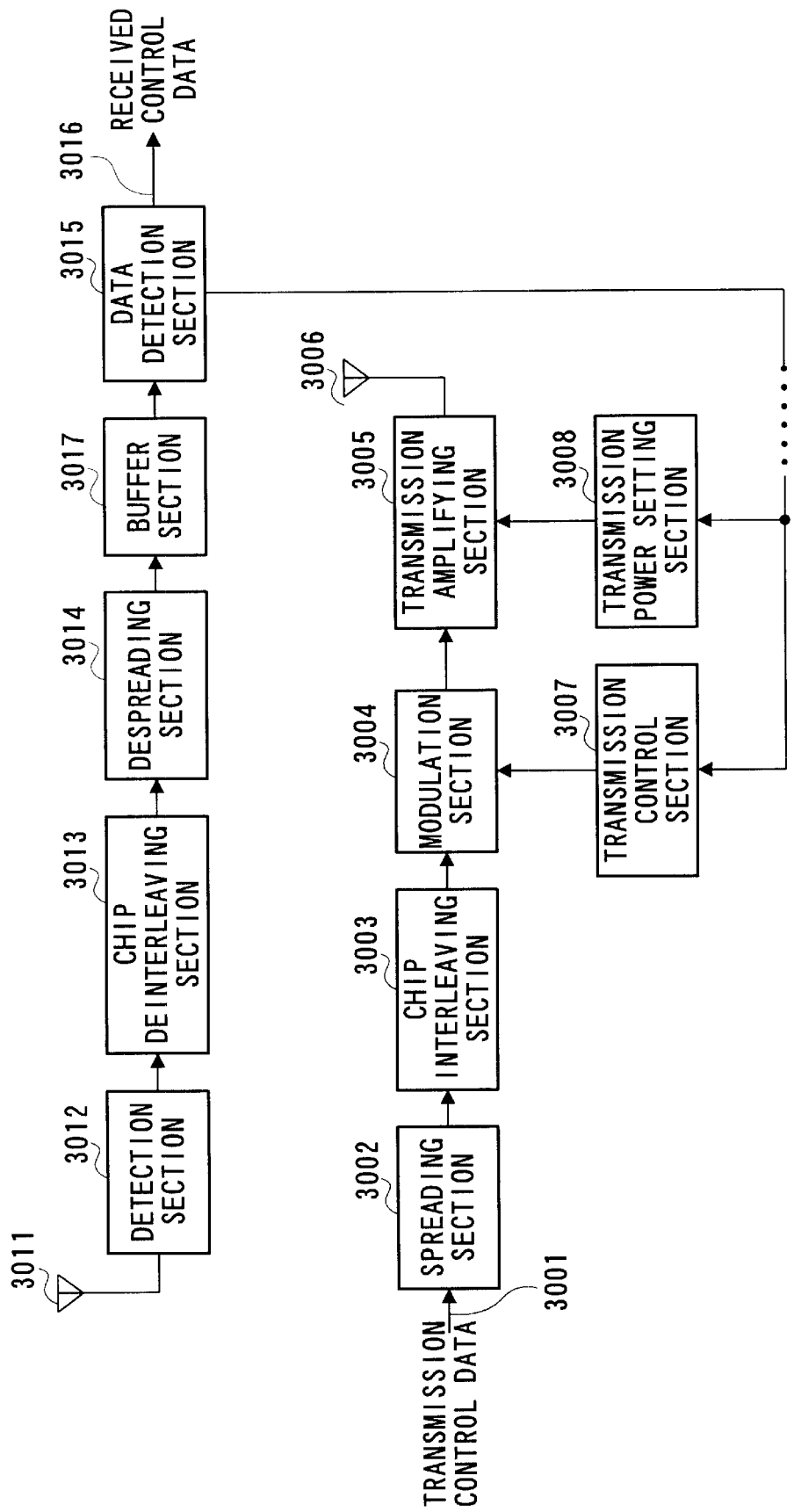
FIG. 30 is a block diagram illustrating a configuration of a CDMA radio communication apparatus according to Embodiment 13 of the present invention.

FIG. 30 is a block diagram illustrating a configuration of a CDMA radio communication apparatus according to Embodiment 14. The basic configuration and operations in the radio communication apparatus of Embodiment 14 are the same as those in Embodiment 13 except that data combined at despreading section 3014 is stored in buffer section 3017, and data detection section 3015 detects data based on power of combined data stored in buffer section 3017. Therefore, the different points are only explained below.

The receiver stores data of slot 1 combined at despreading section 3014 in buffer section 3017. When data detection section 3015 fails to detect the data because power of stored slot 1 data is low, transmission power setting section 3008 controls an amplitude in transmission amplifying section 3005 to be increased. The transmitter thereby transmits slot 2 with higher power than slot 1.

The receiver stores data of slot 2 combined at despreading section 3014 in buffer section 3017. Accordingly, data of slot 1 and slot 2 are stored in buffer section 3017, as a result, power of data corresponds a sum of both data power.

As described above, combined data is stored in buffer section 3017 sequentially. When the sum of power of combined data stored in buffer section 3017 reaches a predetermined power level, data detection section 3015 detects the data, and thus received control data 3016 is obtained.

As described above, according to a radio communication system provided with the radio communication apparatus of Embodiment 14, as the receiver stores control data with less power than a predetermined level sequentially, when the sum of power of control data stored in the buffer reaches the predetermined level, the receiver detects the control data and identifies a user of a transmitter.

Accordingly, since the receiver can not detect a slot until the power reaches the predetermined level, a smaller number of transmission slot is enough than Embodiment 13 in which waste is caused by retransmission of slot with less power than the predetermined level. Therefore, transmission efficiency of transmission control data is further improved, and it is thus possible to shorten the time necessary for the receiver to identify the user of the transmitter. Further, it is possible to reduce power consumption of the receiver.

The present invention solves the problem that a desired quality is not satisfied even if spreading gain is obtained in the case where qualities of all the spread chips deteriorate concurrently due to fading or shadowing. Further, it is thereby possible to reduce the total transmission power and improve the system capacity. Furthermore, it is possible to reduce mutual interference amounts in signals of a plurality of users, which is a basic reason for limiting a capacity in the CDMA system, thereby enabling the system capacity and battery saving in a mobile station both to be improved. Still furthermore, it is possible in the TDD system to shorten a guard time and extend a cell radius.

The present invention is not limited to the above described embodiments, and various variations and modifications may be possible without departing from the scope of the present invention.

This application is based on the Japanese Patent Applications No.HEI10-209911 filed on Jul. 24, 1998, No.HEI11-091429 filed on Mar. 31, 1999 and No.HEI11-094269 filed on Mar. 31, 1999, entire contents of which are expressly incorporated by reference herein.

What is claimed is:

1. A CDMA radio reception apparatus comprising:
a reception section that receives data subjected to spreading by a predetermined spreading factor and subjected to chip interleaving processing;
a chip deinterleaving section that performs chip deinterleaving processing on the received data for every chip;
a synchronization detector that measures an arrival time of the received data; and
a transmission power controller that performs a control, on a CDMA radio transmission apparatus from which the arrival time is too late to complete a reception of the received data in a predetermined time, to limit a transmission time length while increasing transmission power so that the reception is completed in the predetermined time and total transmission power is held constant.

2. The CDMA radio reception apparatus according to claim 1, wherein said transmission power controller controls the transmission time length so that a transmission signal from a CDMA radio transmission apparatus, being received earlier, is completely received before another transmission signal from another CDMA radio transmission apparatus, being received later, is received.

3. The CDMA radio reception apparatus according to claim 1, wherein said transmission power controller performs a control for providing a delay in a transmission starting time at a desired CDMA radio transmission apparatus when there is no difference between arrival times of received data from a plurality of CDMA radio transmission apparatuses.

4. The CDMA radio reception apparatus according to claim 1, further comprising a detector that detects a quality of received data, wherein said transmission power controller controls transmission power of the CDMA radio transmission apparatus in accordance with the detected quality of received data.

5. The CDMA radio reception apparatus according to claim 1, wherein said transmission power controller controls the CDMA radio transmission apparatus to discontinue transmitting when the detected quality of received data in said detector satisfies a predetermined frame quality.

6. The CDMA radio reception apparatus according to claim 1, further comprising:
a likelihood estimator that estimates likelihood on data subjected to chip deinterleaving processing; and
a combiner that performs weighting on data, based on the estimated likelihood to combine the received data which is chip deinterleaved by said chip deinterleaving section.

7. A CDMA radio transmission apparatus that transmits data to a CDMA radio reception apparatus comprising a chip deinterleaving section that performs chip deinterleaving processing on received data for every chip, a synchronization detection section that measures an arrival time of the received data, and a transmission power controller that, with respect to a CDMA radio transmission apparatus from which the arrival time is too late to complete a reception of the received data in a predetermined time, performs a control to limit a transmission time length while increasing transmission power so that the reception is completed in the predetermined time and total transmission power is held constant, said CDMA radio transmission apparatus comprising:
a spreading section that spreads data by a predetermined spreading factor;
a chip interleaving system that performs chip interleaving processing on spread data for every chip; and
a transmission power setting section that sets a transmission power of chip interleaved data into a transmission power controlled by said CDMA radio reception apparatus.

8. A CDMA radio transmission apparatus that transmits data to a CDMA radio reception apparatus comprising a chip deinterleaving section that performs chip deinterleaving processing on received data for every chip, a synchronization detection section that measures an arrival time of the received data, and a time control system that provides a delay in a transmission starting time of data at said CDMA radio transmission apparatus, the CDMA radio transmission apparatus comprising:
a spreading section that spreads data by a predetermined spreading factor;
a chip interleaving section that performs chip interleaving processing on spread data for every chip; and
a time setting section that sets the transmission starting time of chip interleaved data according to the delay of the transmission starting time controlled by said CDMA radio reception apparatus.

9. A CDMA radio communication method comprising:
receiving data subjected to spreading by a predetermined spreading factor and subjected to chip interleaving processing;
performing chip deinterleaving processing on the received data for every chip;
measuring an arrival time of the received data; and
controlling, on a CDMA radio transmission apparatus from which the arrival time is too late to complete a reception of the received data in a predetermined time, to limit a transmission time length while increasing transmission power so that the reception is completed in the predetermined time and total transmission power is held constant.

10. A CDMA radio communication system comprising:
a transmission apparatus comprising a spreading section that spreads transmission data by a predetermined spreading factor, a chip interleaving section that performs chip interleaving processing on spread transmission data, and a transmitting section that transmits the transmission data; and
a reception apparatus comprising a receiving section that receives transmission data subjected to chip interleaving processing, and a chip deinterleaving section that performs chip deinterleaving processing on the received data for every chip, a synchronization detection section that measures an arrival time of the received data, and a transmission power control section that performs a control, on the transmission apparatus from which the arrival time is too late to complete a reception of the received data in a predetermined time, to limit a transmission time length while increasing transmission power so that the reception is completed in the predetermined time and total transmission power is held constant.

11. The CDMA radio communication system according to claim 10, wherein said transmission power control section controls the transmission time length so that a transmission signal from the transmission apparatus, received in the reception apparatus earlier, is completely received before another transmission signal from another transmission apparatus, being received later in the reception apparatus, is received.

12. The CDMA radio communication system according to claim 10, wherein said transmission power control section provides a delay in a transmission starting time of a desired transmission apparatus when there is no difference between arrival times of the received data from a plurality of transmission apparatuses.

13. The CDMA radio communication system according to claim 10, wherein said reception apparatus further comprises a detector that detects a quality of received data, and said transmission power control section controls transmission power at the transmission apparatus in accordance with the detected quality of received data.

14. The CDMA radio communication system according to claim 10, wherein said transmission power control section controls the transmission apparatus to discontinue transmitting after the detected quality of received data in said detector satisfies a predetermined frame quality.

15. The CDMA radio communication system according to claim 10, wherein said reception apparatus further comprises a likelihood estimation section that estimates likelihood on data subjected to chip deinterleaving processing, and a combining section that performs weighting on data, based on the estimated likelihood to combine the received data which is chip deinterleaved by said chip deinterleaving section.

* * * * *

UNITED STATES PATENT AND TRADEMARK OFFICE
CERTIFICATE OF CORRECTION

PATENT NO. : 6,636,723 B1  Page 1 of 1
DATED : October 21, 2003
INVENTOR(S) : K. Kitagawa et al.

It is certified that error appears in the above-identified patent and that said Letters Patent is hereby corrected as shown below:

<u>Title page</u>,
Item [56], References Cited, OTHER PUBLICATIONS, insert the following:
-- English Language Abstract of JP 6-97908
English Language Abstract of JP 6-204987
English Language Abstract of JP 6-97913 --

Signed and Sealed this

Twentieth Day of April, 2004

JON W. DUDAS
*Acting Director of the United States Patent and Trademark Office*